(12) United States Patent
Wang et al.

(10) Patent No.: US 12,238,720 B2
(45) Date of Patent: Feb. 25, 2025

(54) METHOD AND APPARATUS FOR MANAGING INFORMATION IN A WIRELESS COMMUNICATION SYSTEM

(71) Applicant: Samsung Electronics Co., Ltd., Suwon-si (KR)

(72) Inventors: Weiwei Wang, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/532,205

(22) Filed: Dec. 7, 2023

(65) Prior Publication Data

US 2024/0107538 A1    Mar. 28, 2024

Related U.S. Application Data

(63) Continuation of application No. 15/929,360, filed on Apr. 28, 2020, now Pat. No. 11,950,231.

(30) Foreign Application Priority Data

Apr. 30, 2019  (CN) .......................... 201910365426.X
Aug. 12, 2019  (CN) .......................... 201910741644.9
(Continued)

(51) Int. Cl.
*H04W 72/20* (2023.01)
(52) U.S. Cl.
CPC .................................. *H04W 72/20* (2023.01)

(58) Field of Classification Search
None
See application file for complete search history.

(56) References Cited

U.S. PATENT DOCUMENTS 9,264,942 B2   2/2016   Sarkar et al.
10,973,000 B2  4/2021   Jia et al.
(Continued)

FOREIGN PATENT DOCUMENTS

CN   107872876 A   4/2018
WO   2017171354 A1  10/2017
(Continued)

OTHER PUBLICATIONS

First Office Action dated Jan. 31, 2024, in connection with Chinese Application No. 201911083736.9, 26 pages.
(Continued)

*Primary Examiner* — Nguyen H Ngo

(57) ABSTRACT

The present disclosure provides an information configuration method, an information interaction method, and an address information update method. The information configuration method may be performed by a first node, and may include: transmitting, to a second node, a first configuration request message comprising a request for a bearer context setup; receiving, from the second node, a first configuration response message comprising a response to the bearer context setup request in the first configuration request message; and establishing a bear context based on the first configuration response message, wherein the first configuration request message comprises at least one of information related to data profile, or profile indication information.

7 Claims, 19 Drawing Sheets

(30) Foreign Application Priority Data

Sep. 25, 2019 (CN) .......................... 201910912643.6
Nov. 7, 2019 (CN) .......................... 201911083736.9

(56) References Cited

U.S. PATENT DOCUMENTS

| | | | |
|---|---|---|---|
| 2005/0088977 A1* | 4/2005 | Roch | H04L 47/31 370/254 |
| 2009/0016282 A1 | 1/2009 | Gasparroni et al. | |
| 2015/0281099 A1 | 10/2015 | Banavalikar | |
| 2016/0142326 A1 | 5/2016 | Akiyoshi | |
| 2018/0213579 A1* | 7/2018 | Hong | H04W 76/12 |
| 2019/0037417 A1 | 1/2019 | Lei et al. | |
| 2019/0053193 A1 | 2/2019 | Park et al. | |
| 2019/0132790 A1 | 5/2019 | Lee et al. | |
| 2019/0150220 A1 | 5/2019 | Byun et al. | |
| 2020/0084618 A1* | 3/2020 | Teyeb | H04W 80/02 |
| 2020/0084663 A1 | 3/2020 | Park et al. | |
| 2020/0275498 A1* | 8/2020 | Fiorani | H04W 76/11 |
| 2020/0351963 A1 | 11/2020 | Shuai et al. | |
| 2020/0413457 A1* | 12/2020 | Hong | H04W 76/10 |
| 2021/0329509 A1 | 10/2021 | Fiorani et al. | |
| 2022/0174538 A1 | 6/2022 | Zhu et al. | |

FOREIGN PATENT DOCUMENTS

| | | |
|---|---|---|
| WO | 2018009340 A1 | 1/2018 |
| WO | 2019031915 A1 | 2/2019 |

OTHER PUBLICATIONS

European Patent Office, "Communication pursuant to Article 94(3) EPC," dated Feb. 16, 2023, in connection with European Patent Application No. 20799592.9, 10 pages.
European Patent Office, "Supplementary European Search Report," issued May 12, 2022, in connection with European Patent Application No. 20799592.9, 12 pages.
Intellectual Property India, "Examination report under sections 12 & 13 of the Patents Act," issued Apr. 13, 2022, in connection with Indian Patent Application No. 202117053302, 7 pages.
Samsung, "IP address management during the IAB migration," R3-195001 (was R3-193985), 3GPP TSG-RAN WG3 Meeting #105bis, Chongqing, China, Oct. 14-18, 2019, 5 pages.
Samsung, "IP address management during the IAB migration," R3-193985, 3GPP TSG-RAN WG3 Meeting #105, Ljubljana, SI, Aug. 26-30, 2019, 6 pages.
3GPP TR 38.874 V16.0.0 (Dec. 2018) Technical Report; 3rd Generation Partnership Project; Technical Specification Group Radio Access Network; NR; Study on Integrated Access and Backhaul; (Release 16), Dec. 2018, 111 pages.
3GPP TS 38.473 V15.5.0 (Mar. 2019) Technical Specification; 3rd Generation Partnership Project; Technical Specification Group Radio Access Network; NG-RAN; F1 application protocol (F1AP) (Release 15), Mar. 2019, 198 pages.
International Search Report and Written Opinion of the International Searching Authority in connection with International Application No. PCT/KR2020/005590 dated Aug. 13, 2020, 12 pages.
3GPP TS 38.463 V15.3.0 (Mar. 2019), Technical Specification, 3rd Generation Partnership Project; Technical Specification Group Radio Access Network; NG-RAN; E1 Application Protocol (E1AP) (Release 15), Mar. 2019, 166 pages.
Omiotek, "A method for QoS differentiation in DiffServ networks based on the long-term properties of a video stream," Annales UMCS Informatica Lublin-Polonia Sectio AI, 2012, 11 pages.
Communication under Rule 71(3) EPC dated Sep. 14, 2023, in connection with European Application No. 20799592.9, 100 pages.
European Search Report dated Jul. 15, 2024, in connection with European Application No. 23217217.1, 12 pages.
Huawei, "Bearer Mapping in IAB donor-DU and IAB node," R3-191839, 3GPP TSG-RAN WG2 Meeting #103bis, Xi'an, China, Apr. 8-12, 2019, 3 pages.
Qualcomm Incorporated, et al., "IAB topology adaptation for architecture 1a," R3-184693, 3GPP TSG-RAN WG2 Meeting #101, Gothenburg, Sweden, Aug. 20-24, 2018, 13 pages.

* cited by examiner

METHOD AND APPARATUS FOR MANAGING INFORMATION IN A WIRELESS COMMUNICATION SYSTEM

CROSS-REFERENCE TO RELATED APPLICATIONS

This application is Continuation of application Ser. No. 15/929,360, filed on Apr. 28, 2020, which is based on and claims priority under 35 U.S.C. § 119 to Chinese Patent Applications No. 201910365426.X filed on Apr. 30, 2019, No. 201910741644.9 filed on Aug. 12, 2019, No. 201910912643.6 filed on Sep. 25, 2019, and No. 201911083736.9 filed on Nov. 7, 2019, in the Chinese Patent Office, the disclosures of which are incorporated by reference herein in their entirety.

BACKGROUND

1. Field

The present disclosure relates to the field of communication technologies, and in particular, the present disclosure relates to an information configuration method, an information interaction method, and an address information update method.

2. Description of the Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

The purpose of the present disclosure is to solve at least one of shortcomings in the prior art. The technical solutions provided by the embodiments of the present disclosure are set forth as follow:

In one embodiment, a method performed by a first node in a wireless communication system is provided. The method may include transmitting, to a second node, a first configuration request message comprising a request for a bearer context setup; receiving, from the second node, a first configuration response message comprising a response to the bearer context setup request in the first configuration request message; and establishing a bear context based on the first configuration response message, wherein the first configuration request message comprises at least one of information related to data profile, or profile indication information.

In one embodiment, the profile indication information may include at least one of information for setting DSCP (Differentiated Service Code Point), or information for setting a flow label filed.

In one embodiment, the information related to data profile may include at least one of address information of destination which is an IP address used for a user plane transport or TEID (Tunnel Endpoint ID) of the destination indicating which tunnel a particular T-PDU belongs to.

In one embodiment, the profile indication information may be configured per the address information of destination.

In one embodiment, the information related to data profile may be at least one of address information of destination which is an IP address used for a user plane transport or TEID (Tunnel Endpoint ID) of the destination indicating which tunnel a particular T-PDU belongs to.

In one embodiment, the first node may include a gNB-CU-CP and the second node may include a gNB-CU-UP.

In one embodiment, the method may further include receiving a second configuration request message transmitted by a third node, wherein the second configuration request message comprises a request for allocating resource for the third node; and transmitting a second configuration response message to the third node based on the second configuration request message, wherein the second configuration response message comprises a response to the request for allocating resource in the second configuration request message.

In one embodiment, the first node may include a CU (central unit); and the third node may include a MeNB.

In one embodiment, the second configuration response message may include at least one of information of a GTP tunnel endpoint, profile indication information, information for setting DSCP (Differentiated Service Code Point), or information for setting a flow label filed.

In one embodiment, the information of GTP tunnel endpoint in the second configuration response message may include at least one of address information of a destination which is an IP address used for a user plane transport or TEID (Tunnel Endpoint ID) of the destination indicating which tunnel a particular T-PDU belongs to.

In one embodiment, the profile indication information in the second configuration response message may be included in at least one of a DSCP field or a flow label field.

In another embodiment, a method performed by a second node in a wireless communication system is provided. The method may include receiving, from a first node, a first configuration request message comprising a request for a bearer context setup; and transmitting, to the first node, a first configuration response message comprising a response to the bearer context setup request in the first configuration request message, wherein the first configuration request message comprises at least one of information related to data profile, or profile indication information.

In another embodiment, the profile indication information may be configured per the address information of destination.

In another embodiment, the information related to data profile may include at least one of address information of destination which is an IP address used for a user plane transport or TEID (Tunnel Endpoint ID) of the destination indicating which tunnel a particular T-PDU belongs to.

In another embodiment, the first node may include a gNB-CU-CP and the second node may include a gNB-CU-UP.

In yet another embodiment, a first node in a wireless communication system is provided. The first node may include a transceiver and at least one processor. The at least one processor may transmit, to a second node, a first configuration request message comprising a request for a bearer context setup, receive, from the second node, a first configuration response message comprising a response to the bearer context setup request in the first configuration request message, and establish a bear context based on the first configuration response message, wherein the first configuration request message comprises at least one of information related to data profile, or profile indication information.

In yet another embodiment, the first configuration request message may include at least one of information for setting DSCP (Differentiated Service Code Point), or information for setting a flow label filed.

In yet another embodiment, the profile indication information may be configured per the address information of destination.

In yet another embodiment, the first node may include a gNB-CU-CP and the second node may include a gNB-CU-UP.

In yet another embodiment, the at least one processor may be further configured to: receive a second configuration request message transmitted by a third node, wherein the second configuration request message comprises a request for allocating resource for the third node, and transmit a second configuration response message to the third node based on the second configuration request message, wherein the second configuration response message comprises a response to the request for allocating resource in the second configuration request message.

In yet another embodiment, the first node may include a CU (central unit); and the third node may include a base station.

In yet another embodiment, the second configuration response message may include at least one of information of a GTP tunnel endpoint, profile indication information, information for setting DSCP (Differentiated Service Code Point), or information for setting a flow label filed.

In one embodiment, an embodiment of the present disclosure provides an information configuration method, which is performed by a first node, and the method includes: transmitting a first configuration request message to a second node, wherein the first configuration request message is used to request for the configuration of serving user data; and receiving a first configuration response message sent, based on the first configuration request message, by the second node, wherein the first response message is a response to a configuration request in the first configuration request message.

In one embodiment, an embodiment of the present disclosure provides an information configuration method, which is performed by a second node, and the method includes: receiving a first configuration request message transmitted by a first node, wherein the first configuration request message is used to request for the configuration of serving user data; and transmitting a first configuration response message to the first node according to the first configuration request message, wherein the first response message is a response to a configuration request in the first configuration request message.

In one embodiment, an embodiment of the present disclosure provides an information interaction method, which is performed by a fifth node, and the method includes: transmitting a fourth configuration message to a sixth node, wherein the fourth configuration message is used for performing interaction, between the fifth node and the sixth node, with related information of a source transmission node and/or a destination reception node for the user data.

In one embodiment, an embodiment of the present disclosure provides an information interaction method, which is performed by a sixth node, and the method includes: receiving a fourth configuration message transmitted by a fifth node, wherein the fourth configuration message is used for performing interaction, between the fifth node and the sixth node, with related information of the source transmission node and/or the destination reception node for the user data.

In one embodiment, an embodiment of the present disclosure provides a method for updating address information of a relay node, and the method may include any one of the following: a CU of an anchor node transmitting a first address update message to the relay node or a DU of the relay node; the DU of the anchor node transmitting an address update notification message to the CU of the anchor node; and the relay node or the DU of the relay node transmitting an address update request message to the CU of the anchor node.

In one embodiment, an embodiment of the present disclosure provides a method for updating address information of a relay node, and the method may include any one of the following: receiving, by the relay node or a DU of the relay node, a first address update message transmitted by a CU of an anchor node; receiving, by the CU of the anchor node, an address update notification message transmitted by the DU of the anchor node; and receiving, by the CU of the anchor node, an address update request message transmitted by the relay node or the DU of the relay node.

In one embodiment, an embodiment of the present disclosure provides an information configuration apparatus provided in a first node, and the apparatus includes a configuration request transmission module and a configuration response reception module, wherein: the configuration request transmission module is configured to transmit a first configuration request message to a second node, wherein the first configuration request message is used to request for the configuration of serving user data; the configuration response reception module is configured to receive a first configuration response message sent, based on the first configuration request message, by the second node, wherein the first configuration response message is a response to a configuration request in the first configuration request message.

In one embodiment, an embodiment of the present disclosure provides an information configuration apparatus provided in a second node, and the apparatus includes a configuration request reception module and a configuration response transmission module, wherein: the configuration request reception module is configured to receive a first configuration request message transmitted by a first node, wherein the first configuration request message is used to request for the configuration of serving user data; the configuration response transmission module is configured to transmit a first configuration response message to the first node according to the first configuration request message, wherein the first configuration response message is a response to a configuration request in the first configuration request message.

In one embodiment, an embodiment of the present disclosure provides an information interaction apparatus provided in a fifth node, and the apparatus includes a configuration message transmission module, which is configured to: transmit a fourth configuration message to a sixth node, wherein the fourth configuration message is used for performing interaction, between the fifth node and the sixth node, with related information of a source transmission node and/or a destination reception node for the user data.

In one embodiment, an embodiment of the present disclosure provides an information interaction apparatus provided in a sixth node, and the apparatus includes a configuration message reception, which is configured to: receiving a fourth configuration message transmitted by a fifth node, wherein the fourth configuration message is used for performing interaction, between the fifth node and the sixth node, with related information of a source transmission node and/or a destination reception node for the user data.

In one embodiment, an embodiment of the present disclosure provides an apparatus for updating address information of a relay node. If the apparatus is provided in a CU of an anchor node, the apparatus includes an address update message transmission module, which is configured to: transmit a first address update message to the relay node or the DU of the relay node; if the apparatus is provided in the DU of the anchor node, the apparatus includes an address update notification module, which is configured to: transmit an address update notification message to the CU of the anchor node; if the apparatus is provided in the relay node or the DU of the relay node, the apparatus includes an address update request module, which is configured to: transmit an address update request message to the CU of the anchor node.

In one embodiment, an embodiment of the present disclosure provides an apparatus for updating address information of a relay node. If the apparatus is provided in a relay node or a DU of the relay node, the apparatus includes an address update message reception module configured to: receive a first address update message transmitted by a CU of an anchor node; if the apparatus is provided in the CU of the anchor node, the apparatus includes an address update notification reception module configured to: receive an address update notification message transmitted by the DU of the anchor node; if the apparatus is provided in the CU of the anchor node, the apparatus includes an address update request reception module configured to: receive an address update request message transmitted by the relay node or the DU of the relay node.

In one embodiment, an embodiment of the present disclosure provides an information interaction system, including at least one of the apparatuses provided in the seventh to twelfth aspects of the embodiments of the present disclosure.

In one embodiment, an embodiment of the present disclosure provides a communication network system, including the information interaction system provided in the twelfth aspect of the embodiment of the present disclosure.

In one embodiment, an embodiment of the present disclosure provides an electronic device including a processor and a memory, wherein the memory stores a computer program, and the processor is configured to execute the computer program to implement any method of the embodiments of the present disclosure.

In one embodiment, an embodiment of the present disclosure provides a computer-readable storage medium, and a computer program is stored thereon for implementing when the computer program is executed by a processor, the method provided by any embodiment of the present disclosure.

The beneficial effects brought by the technical solutions provided in this disclosure are set forth as follow:
- based on the information configuration method or apparatus provided by this disclosure, the problem is solved that the IAB donor DU cannot distinguish data packets of different user radio bearers when data packets received by the IAB donor DU from different nodes belong to different user radio bearers and have the same target reception IAB node;
- based on the information interaction method or apparatus provided in this disclosure, the problem is solved that each node of service user data in the relay network cannot obtain the address information of the source transmission node and/or destination reception node for the user data;
- based on the method or apparatus for updating the address information of the relay node provided in this disclosure, the problem is solved that updating the GTP-U tunnel or TNL association of the service user will cause significant signaling overhead when changing relay node address of the service user, so that the quick updating of the address information of the GTP-U tunnel and the TNL association of the service user on the relay node side is achieved.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In order to more clearly illustrate the technical solutions in the embodiments of the present disclosure, the drawings used in the description of the embodiments of the present disclosure will be briefly described below.

DETAILED DESCRIPTION

Figure 1:
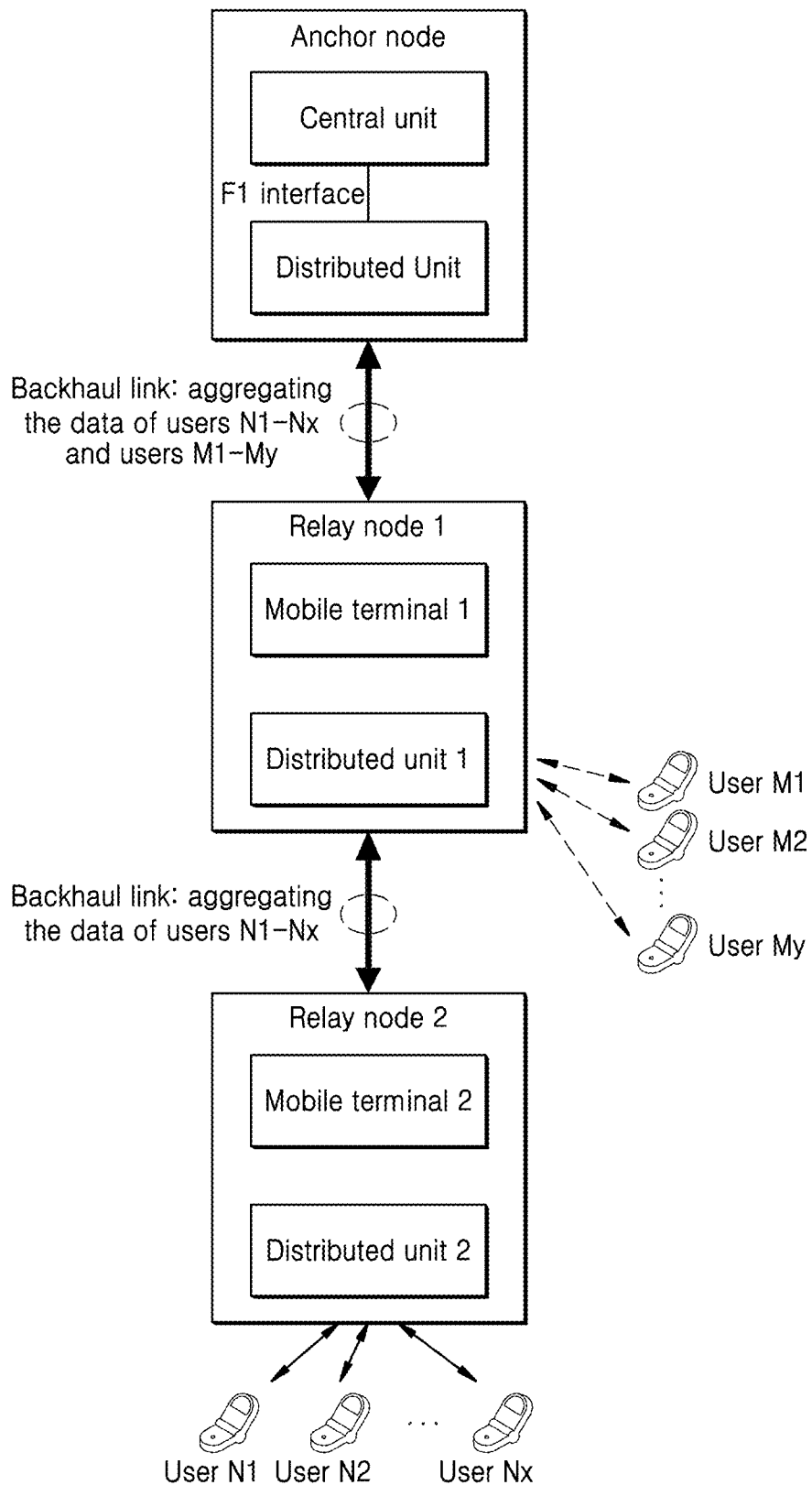
FIG. 1 illustrates a schematic structural diagram of an IAB network architecture according an embodiment of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present disclosure and should not be regarded as any limitations thereto.

The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

FIG. 1 through FIG. 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another, or can operate as standalone schemes.

In the present disclosure, the sequence number or number in a message name is used to indicate the name of the message and does not represent the execution order.

In a new radio (NR) access network or a 5th-Generation (5G) network, in order to extend coverage of the network, a subject matter of Integrated Access and Backhaul (IAB) is proposed, of which the main purpose is to build a multi-hop network architecture.

FIG. 1 illustrates a schematic structural diagram of an IAB network architecture according an embodiment of the present disclosure.

As shown in FIG. 1, a multi-hop network or the IAB network may include an anchor node (IAB donor) and two relay nodes (IAB nodes). All users (i.e., user equipment) may ultimately communicate with the anchor node, wherein users N1~Nx communicate with the anchor node through relay node 2 and relay node 1, and users M1~My communicate with the anchor node through relay node 1.

The anchor node may be composed of a central unit of the anchor node (IAB-donor central unit, or IAB-donor-CU) and a distributed unit of the anchor node (IAB-donor distributed unit, or IAB-donor-DU), and the interface between the central unit and the distributed unit may be the F1 interface (seeing 3GPP TS38.473). The protocol stack included in the central unit may include a protocol stack serving control plane and a protocol stack serving user plane, wherein the protocol stack serving control plane includes a radio resource control (RRC) protocol layer and a packet data convergence protocol (PDCP) layer, and the protocol stack serving user plane includes a service data adaptation protocol (SDAP) layer and the PDCP layer; the distributed unit may include a protocol stack serving control plane and a protocol stack serving user plane, which both include a radio link control (RLC) protocol layer, a medium access control (MAC) protocol layer, and a physical (PHY) layer.

The relay node may include a mobile terminal part and a distributed unit part, wherein the mobile terminal part is used to communicate with an upper-level node of the relay node (for example, mobile terminal 1 may be used to communicate with the anchor node or the distributed unit of the anchor node, and mobile terminal 2 may be used to communicate with the distributed unit 1 of the relay node 1), and the distributed unit part is used to communicate with a next-level node of the relay node (for example, distributed unit 1 may be used to communicate with the mobile terminal 2 or the users M1~My, and distributed unit 2 may be used to communicate with the users N1~Nx). The protocol stack used by the distributed unit part of the relay node to serve the next-level node may be a complete protocol stack, such as a protocol stack including RRC/PDCP/RLC/MAC/PHY used to serve control plane as well as a protocol stack including SDAP/PDCP/RLC/MAC/PHY used to serve user plane; it may also be a protocol stack containing part of protocol layers, such as a protocol stack including RLC/MAC/PHY, or a protocol stack including a part of RLC, MAC, and PHY. The protocol stack used by the mobile terminal part of the relay node to communicate with an upper-level node of the relay node may be a complete protocol stack, such as the protocol stack including RRC/PDCP/RLC/MAC/PHY used to serve control plane as well as the protocol stack including SDAP/PDCP/RLC/MAC/PHY used to serve user plane; it may also be a protocol stack containing part of protocol layers, such as the protocol stack including RLC/MAC/PHY, or a protocol stack including a part of RLC, MAC, and PHY.

In the entire multi-hop network, such as in the multi-hop network shown in FIG. 1, the link between distributed unit 1 and mobile terminal 2 will be used to transmit data of users N1 to Nx, and the link between the distributed unit of the anchor node and mobile terminal 1 will be used to transmit data of users M1~My and users N1~Nx. Such links may have a common feature, that is, a user served by such links may access the network through another distributed unit (rather than accessing the network through the distributed unit at an end of such link), for example, a user served by the link between the distributed unit of the anchor node and the mobile terminal 1 may access to the network through the distributed unit 1 and the distributed unit 2, and the link between the distributed unit 1 and the mobile terminal 2 may be used to serve the user that accesses to the network through the distributed unit 2. In the embodiments of the present disclosure, such links may be referred as backhaul links.

In a long term evolution (LTE)/NR network, user data may be transmitted through a radio bearer (RB), which may also be a data radio bearer (DRB) or signaling radio bearer (SRB). The data radio bearer (DRB) may be used as an example for description, wherein each user's data will be transmitted through one or more DRBs, and each DRB has a corresponding quality of service (QoS) parameter. IAB networks also follow this approach, but unlike single-hop networks, the user's DRB may be transmitted on the backhaul link. In order to realize the transmission for different DRBs of the same user, or the transmission for different DRBs of different users on the backhaul link, the concept of a backhaul channel is also defined accordingly. An example of the backhaul link channel may be a backhaul radio link control protocol layer channel, i.e., the backhaul RLC channel, wherein entities on both ends of this channel are served by RLC/MAC/PHY, and a new protocol layer (such as a backhaul adaptation layer) may be defined above the RLC. In one embodiment, the adaptation layer may refer to Backhaul Adaptation Protocol (BAP).

Figure 2:
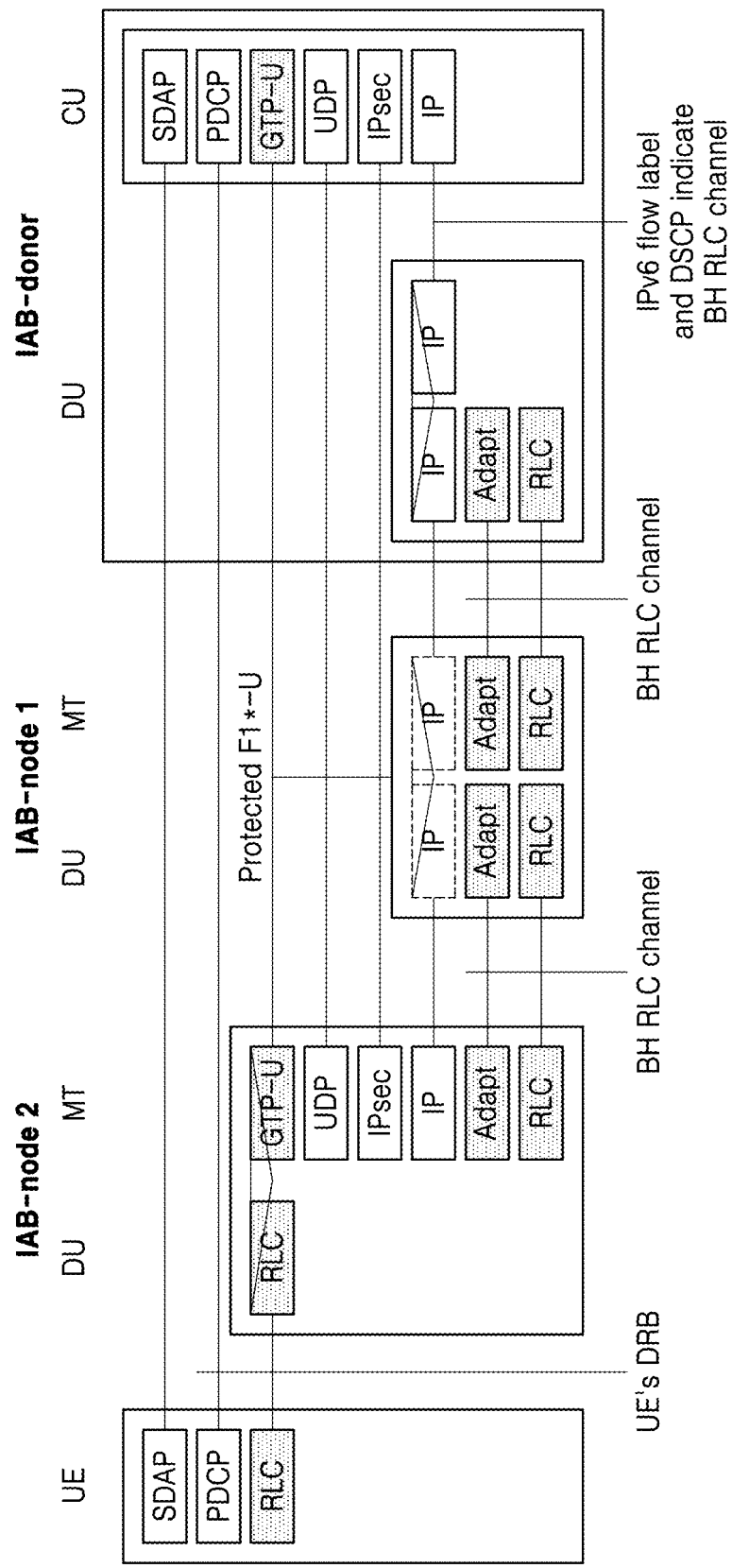
FIG. 2 illustrates a schematic diagram of a protocol stack architecture according to an embodiment of the present disclosure.

FIG. 2 illustrates a schematic diagram of a protocol stack architecture according to an embodiment of the present disclosure.

In order to realize transmitting the data of the radio bearer in a multi-hop IAB network, FIG. 2 is illustrated by an example of achieving transmission for the user plane data by two IAB nodes (i.e., IAB-node 1 and IAB-node 2): as shown in FIG. 2, the UE may be a user terminal device, MT may be the mobile terminal of the relay node, and the protocol stack used by the IAB node may include the RLC, the Adapt (i.e., the adaptation layer, such as BAP (backhaul adaptation protocol)) above the RLC, the Internet Protocol (IP), the security related protocol (IPsec), the User Datagram Protocol (UDP), and the GPRS Tunnel Protocol user plane (GTP-U, that is, GPRS tunnel protocol at the user level); the protocol stacks used by the CU of the anchor node (that is, IAB donor) may include the IP, the IPsec, the UDP, the GTP-U, the PDCP and the SDAP, and protocol stacks used by the DU of the IAB donor may include the RLC, the Adapt, and the IP. The Media Access Control Layer (MAC layer) and the physical layer may also be included below the RLC layer. The schematic diagram may also include a Backhaul RLC channel (the BH RLC channel), and the protocol layers serving the BH RLC channel may include the RLC, the adaptation layer and the MAC and physical layer below the RLC layer. IP packets may be data packets based on the fourth-generation Internet Protocol (IPv4) or sixth-generation Internet Protocol (IPv6), IPsec may be a security protocol that provides security guarantees for transmission for the user plane data (transmitting by the F1 user plane interface (F1*-U in the figure)), and PDCP and RLC may be protocol stacks used by data radio bearers.

Based on the protocol stack architecture, considering the transmission for downlink data (sent by the IAB donor to the user), the data transmission process may be divided into two parts: the first part may be that the data is transmitted from the IAB donor to IAB-node2 (this IAB node is the user's accessing IAB node (accessing relay node), that is, the user may access the network through this IAB node, the uplink data may be transmitted directly to this IAB node, which is then transmitted to the IAB donor directly by the IAB node or via one or more IAB nodes, and the downlink data may be transmitted to the IAB node directly by the IAB donor or via one or more IAB nodes), and the second part may indicate that the data is transmitted from the IAB-node 2 to the user, which may be performed by the existing air interface technology. The data transmission in the first part may include the following steps:

Step 1: the IAB donor CU may transmit data to the IAB donor DU (in this example, it is regarded that the IAB donor node includes CU and DU, and the CU also includes a control plane entity (CU-CP, CU-control plane) and a user plane entity (CU-UP, CU-user plane). For the user plane data, the data may be transmitted by the CU-UP to the IAB donor DU, and for the control plane data, the data may be transmitted by the CU-CP to the IAB donor DU);

Step 2: the IAB donor DU may process the received IP packet. Information related to the radio bearer to which the user data belongs may be included in the IP packet, for example, Differentiated Service Code Point (DSCP) or flow label field may be used to indicate the radio bearer to which the user data belongs and the address information (such as the IP address) of the destination reception node, and based on this information, the IAB donor DU may determine the user radio bearer to which the received IP packet belongs (that is, the IP packet belongs to which radio bearer of which user);

Step 3: the IAB donor DU may determine the backhaul link channel used to transmit the data packet according to the information of the user radio bearer to which the received data packet belongs. Specifically, the data packet received by the IAB donor DU may need to be transmitted to IAB node 1 through the backhaul link between IAB donor DU and IAB node 1. On this backhaul link, data belonging to different user radio bearers may be transmitted by using different backhaul link channels. Therefore, in this step, the IAB donor DU may determine the backhaul link channel used according to the user radio bearer to which the data packet belongs, and transmit the data packet to IAB node 1 through the backhaul link channel; and Step 4: IAB node 1 may transmit the received data to IAB node 2 via a suitable backhaul link channel (the backhaul link channel is a backhaul link channel between IAB node1 and IAB node2).

Through the above four steps, the user data may be transmitted by IAB donor to IAB node 2. Where a key behavior is given in step 2, that is, the IAB donor DU may need to determine the user radio bearer to which the data packet belongs according to the information in the received IP data packet. At present, when determining the user radio bearer to which the data packet belongs, the information, such as the DSCP or flow label field, and/or the address information of the destination reception node (such as the IP address), is considered. The user radio bearer represented by this information may be configured by the IAB donor CU (or IAB donor CU-CP) to the IAB donor DU. Specifically, the configuration information transmitted by the IAB donor CU (or IAB donor CU-CP) to the IAB donor DU may include:

identification information of the user radio bearer, such as identification information of the radio bearer and/or identification information of the user;

DSCP or flow label information;

identification information of the destination reception node, such as IAB node ID, IAB node DU ID; and address information of the destination reception node, such as IP address and/or port information, newly defined address information.

Based on the above configuration information, the IAB donor DU may determine the user radio bearer to which each IP packet received by the IAB donor DU belongs. In the above configuration process, for each user radio bearer, the configuration of the DSCP or flow label may be determined by the IAB donor CU (or IAB donor CU-CP). For data transmitted to the same accessing IAB node (that is, the accessing IAB node may transmit the received data directly to the user), if the data belongs to different user radio bearers, values of the DSCP or flow label configured by the IAB donor CU may be different.

The configuration of the DSCP or flow label in the data packet transmitted to the IAB donor DU is determined by the IAB donor CU, which means that if all data packets are transmitted to the IAB donor DU via the IAB donor CU, then the IAB donor CU may ensure that values of the DSCP or flow label included in the data packets belonging to different user radio bearers are different. However, in an actual network, data of the user radio bearer may be transmitted to the IAB donor DU through different nodes. In an example, in a dual-connection network (a user is connected to two different base stations, such as base station 1 and base station 2), for the data packets of the same user, when some may be transmitted from base station 1 to the user's accessing IAB node, and some may be transmitted from the IAB donor CU of base station 2 to the user's accessing IAB node, there is a probability that the base station 1 and the base station 2 set the DSCP or flow label in the IP packets belonging to different user radio bearers to the same value, and accordingly, the IAB donor DU cannot distinguish different user radio bearers.

In order to better explain the solutions provided in the embodiments of the present disclosure, the following first briefly describes related technical terms involved in the embodiments of the present disclosure.

Information related to user data profile (such as Traffic profile, Data profile, etc.), i.e., the information about data profiles, for convenient description, it can be also referred to as the information related to user data profile, and the information may include at least one of the followings.

Indication information on the radio bearer to which the user data belongs, i.e., the indication information on the radio bearer to which the data packet corresponding to the user data belongs during the transmission of the user data, that is, the indication information is used to indicate the radio bearer to which the user data packet belongs.

Wherein, the indication information on the radio bearer to which the user data belongs may be explicit indication information or implicit indication information. For example, it may specifically be an identifier of the radio bearer to which the user data belongs, such as DRB ID, SRB ID; it may also be other indication information, for example, the indication information may be 5 if the radio bearer to which the user data packet belongs is DRB1 (that is, DRB ID=1), and the indication information may be 6 if the radio bearer to which the user data packet belongs is DRB2 (that is, DRB ID=2). Accordingly, the indication information of 5 represents DRB1, and the indication information of 6 represents DRB2.

Indication information on the user to which the user data belongs, i.e., information for indicating the source UE transmitting user data or the destination UE receiving the user data. The indication information may be used to indicate the user to which the user data packet belongs.

Similarly, the indication information on the user to which the user data belongs may be explicit indication information or implicit indication information. For example, it may be identification information on a user to which the user data belongs, such as a UE ID; wherein for uplink data, the identification information may be identification information of a UE in transmission side, that is, a source UE, for the user data packet, and for downlink data, the identification information may be identification information of a UE in reception side, that is, the destination UE, for the user data packet; it may also be other indication information, for example, the indication information may be 2 if the user to which the user data packet belongs is UE 3 (that is, the UE ID is 3), and the indication information may be 3 if the user to which the user data packet belongs is UE 5 (that is, the UE ID is 5); accordingly the indication information of 2 represents UE 3, and the indication information of 3 represents UE 5.

Indication information for indicating the user and radio bearer to which the user data belongs, which the indication information may indicate the user and radio bearer to which the user data belongs. If the indication information is 1, the indication information may mean that the user data belongs to the radio bearer 2 of the user 1, and if the indication information is 2, the indication information may mean that the user data belongs to the radio bearer 6 of the user 3.

That is, the user to which the user data belongs and the radio bearer to which the user data belongs may be indicated separately by different information, or may be indicated by one piece of information.

Indication information on the backhaul link channel used for transmitting user data, where the indication information may indicate the backhaul link used to transmit user data (such as the identification information on the backhaul link channel, the logical channel identification information on the backhaul link channel).

Indication information of the type of user data. The types that may be indicated by the indication information may include: DRB (indicating that the user data contained in the user data packet is the user's user plane data), and F1 signaling (F1 interface information). The indication information may also be used to indicate different types of F1 signaling (for example, the user-associated F1 signaling and the non-user-associated F1 signaling, wherein for the user-associated F1 signaling, the indication information may also be used to indicate that the types of F1 signaling may be F1 signaling including RRC messages of SRB0 bearer, and/or F1 signaling including RRC messages of SRB1 bearer, and/or F1 signaling including RRC messages of SRB2 bearer, and/or F1 signaling including RRC messages of SRB3 bearer, etc.), if the F1 signaling is divided into different types. The indication information may also be used to indicate the above-described multiple types of F1 signaling (for example, the types of F1 signaling indicated are "the non-user associated F1 signaling" together with "the user-associated F1 signaling that includes the RRC information of SRB0 bearer", or "F1 signaling that includes the RRC information of SRB1" together with "F1 signaling that includes the RRC information of SRB3", etc.). The indication information may also be used to indicate whether the user data packet is a newly transmitted data packet or a retransmitted data packet if the user data packet is further divided into a newly transmitted data packet or a retransmitted data packet. The indication information may be explicit information or implicit information.

Information related to the destination reception node, wherein in one embodiment, the destination reception node may be the accessing relay node for the user, and further used to receive the downlink data; in another embodiment, the destination reception node may be the central unit of the anchor node, and further used to receive the uplink data; in another embodiment, the destination reception node may be the distributed unit of the anchor, and further may be used to receive the uplink data or downlink data. The information related to the destination reception node may include at least one of the following information:

the identification information of the destination reception node;

address information of destination reception node, such as IP address or newly defined address, etc.

port information of the destination reception node; and

TEID (Tunnel Endpoint ID) of the destination reception node.

Information related to the source transmission node, which may be the central unit of anchor node, or other base stations, or the central units of other base stations, or other network entities (such as Operation Administration and Maintenance (OAM)), or the accessing relay node for the user, and may be further used to transmit the uplink data or downlink data, wherein the related information includes at least one of the following information:

identification information of the source transmission node;

address information of the source transmission node, such as IP address or newly defined address, etc.

port information of the source transmission node; and

TEID of the source transmission node.

Information related to the user data transmission path, where this information indicates the path of the user data (understandably, the user data is transmitted in the form of data packets during transmission) transmitted from the source transmission node or the distributed unit of the anchor node to the destination reception node (i.e., the accessing relay node), or indicates the next hop node for the user data, and the information includes at least the following information:

identification information of the path (such as path ID);

the identification information and/or address information of the nodes by which the data passes sequentially, when the data is transmitted in the path. For example, if the data packet including the user data passes by the node 1, node 2, and node 3, the information related to the user data transmission path may include the identification information and/or address information of node 1, the identification information and/or address information of node 2, and the identification information and/or address information of node 3; and the identification information of the next hop node when data is transmitted on this path.

Each data packet may have corresponding information related to user data packet profiles, and if the information about the user data packet profiles of the data packets is different, the data packets may have different user packet data profiles.

Indication information of user data profile (for the convenience of description, this information may be referred to simply as profile indication information), where this indication information will be included in each user data packet, and its role is to distinguish user data with different user data profiles, that is, if the received data packets contain different indication information, the information related to user data profile corresponding to these data packets (see the above-mentioned "information related to user data profile") may be also different. That is, the indication information may be used to represent the profiles (or profile set) of the user data packet, and if the indication information is different, the profiles of the user data packet may be different.

For example, as a schematic example, it is assumed that the information related to the profiles of a type of data packet is: DRB ID being 1, UE ID being 22, and the indication information of the type of user data being DRB, and the "profile indication information of the user data" representing the profile of this type of data being 1; the information related to the profile of another type of data packet is: DRB ID being 5, UE ID being 22, and the indication information of the type of user data being DRB, and the "profile indication information of the user data" representing the profile of this type of data being 2. The indication information 2 in this example may represent the profile information of the data packet as: DRB ID being 5, UE ID being 22, and the type of user data being DRB. When transmitting the user data packet, if the profile indication information of the user data contained in the user data packet received by a node is "1", the profile representing the data packet may be: DRB ID being 1, UE ID being 22, and the type of user data being DRB; if the profile indication information of the user data contained in the user data packet received by a node is "2", the profile representing the data packet may be: DRB ID being 5, UE ID being 22, and the type of user data being DRB.

In one embodiment, the profile indication information may be identification information (such as BH RLC CH ID) indicating a backhaul link channel carrying user data, or logical channel identification information (such as BH RLC CH LCID) indicating a backhaul link channel carrying user data.

In one embodiment, the profile indication information may be a combination of one or more pieces information, contained in the "information related to data profile", indicated by the profile indication information. In another embodiment, the profile indication information of the user data may be part of a piece of information, contained in the above-mentioned "information related to data profile", indicated by the profile indication information of the user data. In another embodiment, the profile indication information of the user data may be a redefined indication information indicating the user data for different "information related to data profile".

In one embodiment, the profile indication information may be included in a DSCP field (which may be a complete DSCP field or a part of a DSCP field) of an IP packet. In another embodiment, the profile indication information may be included in a flow label field (which may be a complete flow label field or a part of a flow label field) of an IP packet. In another embodiment, the indication information may be included in a DSCP+flow label field of the IP packet (which may be a complete field of the DSCP+flow label or a partial field of the DSCP+flow label); in another embodiment, the indication information may be included in other fields of the data packet, such as a header of a PDCP packet, a header of an RLC packet, a header of an adaptation layer (ex. BAP (Backhaul Adaptation Protocol), and the like.

In an embodiment, the name of the indication information in the message may be DSCP; in another embodiment, the name of the indication information in the message may be flow label; the indication information may also be other names (such as traffic profile ID).

In an embodiment, the indication information may also be regarded as a part of the user data profile, that is, the "profile indication information of the user data" may be one of the information included in the above "information related to the user data profile (such as Traffic profile, Data profile)".

For example, as an example, for the user data carried by the user radio bearer 1, the profile indication information corresponding to the user data may be 121, and the data packet may belong to the user radio bearer 1 if the indication information 121 is contained in a data packet, that is, the user radio bearer used for transmitting the data packet may be the user radio bearer corresponding to the identifier 1. In another embodiment, the profile indication information may be combined with other information to jointly indicate the profile of the data packet containing the information. Taking the above indication information to distinguish different user radio bearers as an example, the indication information may be combined with the information of the destination reception node of the data packet (such as the identification information of the destination reception node, the address information of the destination reception node, where the destination reception node may be the accessing IAB node) to indicate the user radio bearer to which the data packet belongs; the indication information may also be combined with the information of the transmission node of the data packet (such as the identification information of the transmission node and the address information of the transmission node, where the transmission node may be the source transmission node for the data packet, such as the base station, the central unit of the base station, and OAM) to indicate the user radio bearer to which the data packet belongs; the indication information may also be combined with the information of the destination reception node and transmission node of the data packet (such as the identification information of the destination reception node, address information of the destination reception node, identification information of the transmission node, and address information of the transmission node, where the destination reception node may be the accessing IAB node, and the transmission node may be a source transmission node for the data packet, such as the base station, the central unit of the base station, and OAM) to indicate the user radio bearer to which the data packet belongs.

Information related to the destination reception node, wherein in one embodiment, the destination reception node may be the accessing relay node for the user, and further used to receive the downlink data; in another embodiment, the destination reception node may be the central unit of the anchor node, and further used to receive the uplink data; in another embodiment, the destination reception node may be the distributed unit of the anchor node, and further the destination reception node may be used to receive the uplink data or downlink data, wherein the related information includes at least one of the following:

the identification information of the destination reception node;

address information of the destination reception node, such as IP address, and/or newly defined address;

port information of the destination reception node; and

Tunnel Endpoint ID (TEID) of the destination reception node.

Information related to the source transmission node, which may be the central unit of anchor node, or other base stations, or the central units of other base stations, or other network entities (such as OAM), or the accessing relay node for the user, and the source transmission node may be further used to transmit the uplink data or downlink data, wherein the related information may include at least one of the following information:

identification information of the source transmission node;

address information of the source transmission node, such as IP address, and/or newly defined address;

port information of the source transmission node; and

TEID of the source transmission node.

Information related to the user data transmission path, where this information may indicate the path of the user data (understandably, the user data is transmitted in the form of data packets during transmission) transmitted from the source transmission node or the distributed unit of the anchor node to the destination reception node (i.e., the accessing relay node), or indicate the next hop node for the path, and the information may include at least the following information:

identification information of the path (such as path ID);

the identification information and/or address information of the nodes by which the data passes sequentially, when the data is transmitted in the path. For example, if the data packet including the user data passes by the node 1, node 2, and node 3, the information related to the user data transmission path may include the identification information and/or address information of node 1, the identification information and/or address information of node 2, the identification information and/or address information of node 3, or the indication information and/or address information of the next hop during transmitting the data on the path.

In the current user data transmission scheme, there are at least the following problems:

The first aspect: when the IAB donor DU receives data packets from different nodes, different nodes may set the DSCP or flow label in the IP packets belonging to different user radio bearers to the same value, thus causing the IAB donor DU to fail to differ different user radio bearers.

The second aspect: each node for serving user data in the relay network (the network in which the accessing relay node (i.e., the relay node accessed by the user, for example, a relay node 2 directly accessed by user N1~Nx as shown in FIG. 1) may communicate with the anchor node through other relay nodes, for example, the relay node 2 may communicate with the anchor node directly through a relay node 1 as shown in FIG. 1) may fail to learn the related information (e.g., the address information, the node identification information, and the port information of the node) of the source transmission node and the related information (e.g., the address information, the node identification information, and the port information of the node) of the destination reception node (i.e., the accessing relay node) for the user data packet, which is not conducive to assign the profile indication information for distinguishing user data to user data packets.

The third aspect: when the address of relay node serving user changes, updating of the GTP-U tunnel or TNL association for serving user will cause a large signaling overhead. Specifically, in the relay network, when the address information of the relay node changes, and the relay node is connected to a new anchor node or a distributed unit of a new anchor node, the change for this address will cause that the user data served thereof cannot be transmitted to this relay node correctly.

Figure 3:
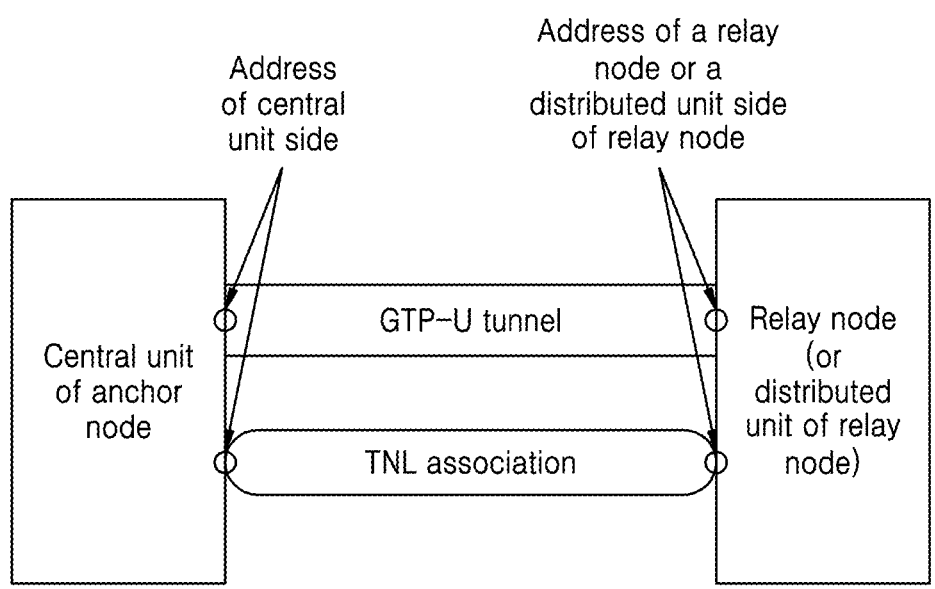
FIG. 3 illustrates an example diagram of a GTP-U tunnel and TNL association according to an embodiment of the present disclosure.

FIG. 3 illustrates an example diagram of a GTP-U tunnel and TNL association according to an embodiment of the present disclosure.

As shown in FIG. 3, the transmission of user data is based on a GTP-U tunnel or Transport network layer association (TNL association) established between a central unit of an anchor node and a distributed unit of a relay node. Where the GTP-U tunnel is used to transmit user data, and different GTP-U tunnels are used for different user data profiles (such as data of different user radio bearers). A GTP-U tunnel needs to be represented by the address information of the receiving terminal and/or the address information of the transmitting terminal, wherein the address information includes an IP address and a Tunnel Endpoint identifier (TEID). The TNL association is used to transmit control plane data, and the TNL association also needs to be represented by the address information of the receiving terminal and/or the address information of the transmitting terminal, wherein the address information includes the IP address and/or the port number, as shown in FIG. 3. It may be seen that the GTP-U tunnel and the TNL association are both related to the address information of the relay node (or the distributed unit of the relay node). Therefore, when the address information of the relay node (or the distributed unit of the relay node) is changed, the GTP-U tunnel or the TNL association used to transmit user data is unavailable, and the information of the GTP-U tunnel or the TNL association on the relay node (or the distributed unit of the relay node) side is required to be updated to continue serving the user. However, this needs to update each GTP-U tunnel or each TNL association of each radio bearer of the user separately, which results in a large signaling overhead. In addition, in the existing mechanism, the relay node is not allowed to initiate requests for updating, adding, and deleting address information, so that the relay node cannot adjust its address information.

In order to solve the above technical problems, the embodiments of the present disclosure provide an information configuration method, an information interaction method, and an address information update method.

In order to make the purposes, technical solutions, and advantages of the present disclosure clearer, the technical solution of the present disclosure and how the technical solution of the present disclosure solves the foregoing technical problems will be described in detail with specific embodiments in conjunction with the accompanying drawings. The following specific embodiments may be combined with each other, and the same or similar concepts or processes may not be repeated in some embodiments. The embodiments of the present disclosure will be described below with reference to the drawings.

In view of the above-mentioned problems in the first aspect, an embodiment of the present disclosure provides an information configuration method, which configures different types of user data packet through signaling interaction between network nodes (the embodiments of the present disclosure describe this by using a first node and a second node as an example).

Figure 4:
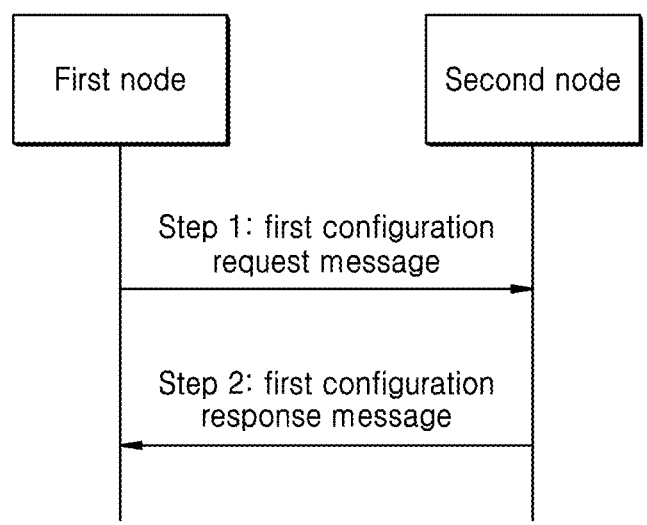
FIG. 4 illustrates a schematic flowchart of an information configuration method according to an embodiment of the present disclosure.

FIG. 4 illustrates a schematic flowchart of an information configuration method according to an embodiment of the present disclosure.

As shown in FIG. 4, for the information configuration method, the signaling interaction process will involve the first node and the second node. The first node is used as the execution body of the method. The method may include the following steps:

Step 1: The first node may transmit a first configuration request message to the second node; and Step 2: The first node may receive a first configuration response message based on the first configuration request message from the second node.

In one embodiment, the first configuration request message may be used to request for the configuration of serving user data, and the first response message may be used to respond to the configuration request in the first configuration request message, that is, the first configuration request message and the first configuration response message may be used to negotiate the profile indication information of the user data between the first node and the second node. The first configuration response message may be an acknowledgement of the message received in Step 1. The data profile indication information may be used to distinguish data packets with different profiles. For a data packet, the relevant profiles of the data packet may be determined according to the data profile indication information contained in the data packet, and the type of the data packet may be uniquely determined according to the determined relevant profile of the data packet or according to the relevant profile and other information of the data packet. That is, based on the indication information negotiated by the first node and the second node, or based on the indication information and other information in the user data packet, the type of the user data packet (such as the radio bearer to which the user data packet belongs and F1 signaling to which the user data packet belongs) may be uniquely determined.

Based on the solution of the embodiment of the present disclosure, the first node and the second node may implement the negotiation and confirmation of the profile indication information of user data through the interaction of the first configuration request message and the first configuration response message. When a node in the network transmits user data (that is, a user data packet), based on the profile indication information of the user data negotiated and confirmed by the interaction process, that is, the profile indication information, the profile indication information of the user data may be configured; alternatively, the type of the user data packet may be determined according to the profile indication information of the user data carried in the received data packet, or according to the indication information and other information carried in the data packet; or the user radio bearer or the F1 singling to which the data packet belongs may be determined according to the determined type of the user data packet, to select the appropriate backhaul link channel.

It should be noted that the names of the messages (including the user's first configuration request message, the first configuration response message, and various messages below) involved in the embodiments of the present disclosure are only one of optional examples, which is not unique, and in actual applications, other message names may also be used. For example, the message name of the first configuration request message described above may be changed. This message may be used to identify a message, transmitted from the first node to the second node, for negotiating and determining the profile indication information of the user data, in order to be capable of uniquely distinguishing different types of user data packets based on this indication information or based on this indication and other information carried by a user data packet when the user data packet is transmitted, that is, the type of the user data packet may be uniquely determined, while its name may be not unique.

In an alternative embodiment of the present disclosure, the first configuration request message may carry information related to user data packet that the first node expects or requests to be accepted by the second node, and the first configuration request message includes at least one of the following:
  information related to data profile;
  profile indication information;
  information related to the destination reception node;
  information related to the source transmission node; and
  information related to the user data transmission path.

Wherein, the user data packet of which the type is targeted by the first configuration request message may be transmitted by another base station (or a central unit of another base station) or a central unit of the anchor node to the user's accessing relay node through the distributed unit of the anchor node.

It should be noted that, in the embodiments of the present disclosure, other base stations refer to base stations other than the base station to which the anchor node belongs in the embodiments of the present disclosure. For example, when the first node and the second node are anchor nodes or part of the anchor node (such as the CU of the anchor node), the other base stations may be other base stations rather than the base station to which the anchor node belongs. If only one of the first node and the second node is the anchor node or part of the anchor node, the other base stations may be also other base stations rather than the base station to which the first node or the second node belongs.

In an alternative embodiment of the present disclosure, the first configuration response message may carry information related to user data that is accepted by the second node, and the first configuration response message may include at least one of the following:
  information related to data profile;
  profile indication information;
  information related to the source transmission node;
  information related to the destination reception node; and
  information related to the user data transmission path.

It may be understood that, in actual applications, in order to negotiate the profile indication information of user data, at least one of the first configuration request message or the first configuration response message may include profile indication information of user data. In addition, one of the first configuration request message and the first configuration response message may not include profile indication information of user data, and certainly, in some embodiments, the first configuration request message and the first configuration response message may both include the profile indication information of user data. For example, the first configuration request message may carry profile indication information of user data that the first node expects or requests to be accepted by the second node, and the first configuration response message may include, in addition to profile indication information of user data, information related to user data accepted by the second node, such as information related to user data packets accepted by the second node. Certainly, in this example, the first configuration response message may also include indication information of the profile of the user data accepted by the second node.

It should be noted that the user data accepted by the second node refers to a certain type or types of data that the second node agrees to serve, that is, the second node may agree to serve data packets having which profiles. For example, the first configuration request message may include information related to two types of user data, specifically, and as listed in the previous example, the two types of user data may include a type of data having the information related to user data profile of: DRB ID being 1, UE ID being 22, the indication information of the type of the user data being DRB, and the indication information of the data profile being "1"; and a type of data having the information related to user data profile of: DRB ID being 5, UE ID being 22, the indication information of the type of the user data being DRB, and the indication information of the data profile being "2"; if in the two types of user data, the information related to the profile of the data that the second node agrees to serve is: DRB ID being 1, UE ID being 2, and the indication information of the type of the user data being DRB, the first configuration response message may include the information related to the profile of this type of user data that the second node agrees to serve.

In an optional embodiment of the present disclosure, the first node and the second node may include any one of the following:
  the first node is the CU of the anchor node, and the second node is the DU of the anchor node, another base station, or the CU of another base station;
  the first node is the CU-CP of the anchor node, and the second node is the CU-UP of the anchor node, the DU of the anchor node, another base station, or the CU of another base station; and
  the first node is another base station or a CU of another base station, and the second node is a CU of an anchor node or a CU-CP of the anchor node.

That is, the first configuration request message transmitted by the first node to the second node may be transmitted by the central unit of the anchor node (or the CU-CP of the anchor node) to the distributed unit of the anchor node, or by the central unit of the anchor node (or the CU-CP of the anchor node) to other base stations (or the central unit of other base stations), or by the other base stations (or the central unit of other base stations) to the central unit (or the CU-CP of the anchor node) of the anchor node, or by the control plane part of the central unit of the anchor node to the user plane part of the central unit of the anchor node.

Correspondingly, the first configuration response message transmitted by the second node to the first node may be transmitted by the distributed unit of the anchor node to the central unit of the anchor node (or the CU-CP of the anchor node), or by other base stations (or the central unit of other base stations) to the central unit of the anchor node (or the CU-CP of the anchor node), or by the central unit of the anchor node (or the CU-CP/CU-UP of the anchor node) to other base stations (or the central unit of the other base stations), or by the user plane part of the central unit of the anchor node to the control plane part of the central unit of the anchor node.

In an optional embodiment of the present disclosure, the profile indication information of the user data may be configured by any one or more of the following nodes:
  CU of the anchor node;
  CU-CP of the anchor node;
  CU-UP of the anchor node;
  DU of the anchor node;
  another base station or CU of another base station; and
  source transmission node for user data.

That is, for user data of different users, the profile indication information of the data may initially be generated (configured) by any one or more of the above network node. Therefore, in the information configuration method shown in FIG. 4, in step 1, if the first configuration request message may include profile indication information of user data, one implementation is that the information is generated, i.e., configured, by the first node, and the other implementation is that the information is obtained by the first node from other nodes. Similarly, in step 2, if the first configuration response message includes profile indication information of user data, one implementation is that the information is generated by the second node, and the other implementation is that the information is obtained by the second node from other nodes.

Optionally, when the profile configuration information (configured by the first node or obtained from other nodes) is included in the first configuration request message, the first configuration response message may include at least information related to user data profile, so that through the information, the first node (such as the central unit of the anchor node) knows that user data of which profile is accepted by the distributed unit.

In an optional embodiment of the present disclosure, the information configuration method may further include: receiving a second configuration request message transmitted by a third node, wherein the second configuration request message is used to request for the configuration of serving user data; and transmitting the second configuration response message to the third node based on the second configuration request message, wherein the second response message is a response to a configuration request in the second configuration request message.

It may be understood that the third node may be a network node different from the first node and the second node. For example, in an optional manner, the first node may be the CU of the anchor node, the second node may be the DU of the anchor node, and the third node may be another base station or the CU of another base station.

That is, in actual applications, when the first node and the second node negotiate the profile indication information of the user data, the first node and the third node may also negotiate the profile indication information of the user data. Wherein, the negotiation process between the first node and the second node (referred to as the first process) and the negotiation process between the first node and the third node (referred to as the second process) may be related in time or may also be unrelated. For example, the second process may be before the first process, the second process and the first process may be interleaved, and the second process may be after the first process.

As an example, assuming that the first node is the CU (or CU-CP) of the anchor node and the second node is the DU (CU-UP) of the anchor node, and the CU (or CU-CP) and DU (or CU-UP) of the anchor node itself may perform the above message interaction, the CU (or CU-CP) of the anchor node may also negotiate with another base station (or CU of another base station) on the profile indication information of user data. Another base station (CU of another base station) may obtain the profile indication information of user data acceptable by the DU from the CU by transmitting the configuration request information to the first node.

This is because, in an actual network, some data may be transmitted to the distributed unit of the anchor node by another base station. In order for the data packets to also include profile indication information of user data, another base station (the CU of another base station) may be required to be informed, for allowing the another base station (the CU of the another base station) to add indication information to each data packet according to this configuration information. For example, the profile indication information of the user data may be configured by the first node and the first node may transmit a first configuration request message to the second node, so that when the data packet is transmitted, the distributed unit may obtain the profile of the user data in the data packet according to the indication information included in the data packet; the first node may transmit the second response message to another base station so that the another base station may add the profile indication information to each data packet according to this configuration information.

Optionally, for one type of user data (for example, the user data may be transmitted to the distributed unit of the anchor node by another base station), the second configuration request message may include any one of the following information:

information related to data profile;
information related to the source transmission node; and
information related to the destination reception node.

Based on one or more pieces of these information, other base stations (or CUs of other base stations) may inform the central unit (or CU-CP) of the anchor node that other base stations (or CUs of other base stations) request or intend the anchor node to serve the user data with this user data profile.

Optionally, for one type of user data (in an implementation manner, the user data may be accepted by the central unit of the anchor node), the message in the second configuration response message may include at least one of the following information items:

information related to data profile;
profile indication information of the user data and
information related to the destination reception node.

Through the profile indication information of the user data in the second configuration response message, the other base stations (or the CUs of the other base stations) may be informed of the profile indication information of the user data configured by the central unit (or the CU-UP) of the anchor node, or the profile indication information of the user data obtained by the central unit (or the CU-UP) of the anchor node from the distributed unit (or the CU-UP, or other nodes) of the anchor node, or the profile indication information of the user data accepted by the distributed unit (or the CU-UP) of the anchor node, which is obtained by the central unit (or the CU-UP) of the anchor node from the distributed unit (or the CU-UP) of the anchor node. Through the information related to the profile of the user data and/or the information related to the destination reception node, the other base stations (or the CUs of the other base stations) may be informed of the information related to the user data targeted by the profile indication information of the user data.

In an optional embodiment of the present disclosure, receiving of the second configuration request message may be before transmitting the first configuration request message to the second node. The user data targeted by the first configuration request message may be determined according to the user data targeted by the second configuration request message.

That is, when the first node transmits the first configuration request message after receiving the second configuration request message, the user data requested by the first configuration request message may be determined by the user data requested according to the second configuration request message.

In an optional embodiment of the present disclosure, if the profile indication information of the user data is configured by the first node, the second configuration response message may be transmitted to the third node after receiving the first configuration response message, or before transmitting the first configuration request message to the second node.

That is, when the profile indication information of the user data is not configured by the second node, the first node may feedback the second configuration response message to the other base station (or the CU of the other base station) at an appropriate timing according to actual needs or configurations.

In an optional embodiment of the present disclosure, if the profile indication information of the user data is configured by the second node, the second configuration response message may be transmitted to the third node after receiving the first configuration response message.

In this solution, since the profile indication information of the user data is configured by the second node, the first node may feed back the second configuration response message with the data profile indication information to the third node, which is required to be performed after receiving the data profile indication information carried in the first configuration response message.

In an optional embodiment of the present disclosure, if the third node transmits the second configuration response message, after receiving the first configuration response message, the second configuration response message may be determined based on the first configuration response message.

In an optional embodiment of the present disclosure, the first configuration response message may be determined by the second node based on the third configuration response message, wherein the third configuration response message may be obtained by the second node in the following manner:

transmitting the third configuration request message to the fourth node; and receiving the third configuration response message, which is fed back by the fourth node based on the third configuration request message.

Wherein, the third configuration request message may be used to request for the configuration of serving user data, and the third response message may be used to respond to the configuration request in the third configuration request message.

Taking the first node as another base station or a CU of another base station as an example, in this solution, the second node (such as the CU of the anchor node, the CU-CP of the anchor node, or the CU-UP of the anchor node, etc.) may first transmit the third configuration request message to the fourth node before feeding back the first configuration response message to the first node, to negotiate with the fourth node about determining the profile indication information of the user data accepted by the distributed unit of the anchor node, so that the second node feeds back the first configuration response message to the first node, wherein the user data targeted by the response message may be the user data accepted by the fourth node, that is, this response message may include the information related to the user data accepted by the fourth node (e.g., the information related to the user data profile, the information related to the source transmission node, the information related to the destination reception node, etc.). The user data targeted by the third configuration request message may be transmitted by the first node and transmitted to the fourth node (such as a user accessing relay node) via the second node.

In the information configuration method provided in the embodiment of the present disclosure, the first configuration request message may be an S-Node addition/modification request message of an Xn interface, or an SgNB addition/ modification request message of an X2 interface, or an UE context setup/modification request message of F1 interface, or a bearer context setup/modification request message of the E1 interface, or other newly defined messages, which may be configured according to actual requirements in actual applications. Correspondingly, the first configuration response message may be an S-Node addition/modification response message of the Xn interface, or an SgNB addition/ modification response message of the X2 interface, or a UE context setup/modification response message of the F1 interface, or a bearer context setup/modification response message of the E1 interface, or other newly defined messages. It may be understood that the interface corresponding to the first configuration request message is corresponding to that of the first configuration response message.

The information configuration method provided in the embodiment of the present disclosure performs the above Step 1 and Step 2 through the first node and the second node between the central unit of the anchor node and the distributed unit of the anchor node, and/or the other base stations (or the central units of the other base stations) and the central unit of the anchor node, which may assist the distributed unit of the anchor node to distinguish different types of data, so as to transfer different types of data to the appropriate backhaul link channel for transmission. The central unit of the anchor node and the other base stations may set the information in the data packet (such as setting the DSCP and/or flow label fields) according to the profile indication information of the user data configured in above processes, and the distributed unit of the anchor node may determine the type of the received user data according to the profile indication information of the user data and/or information related to the source transmission node and/or information related to the destination reception node and/or information related to the user data transmission path configured in the above processes to determine the type of received user data.

For example, taking the central unit of the anchor node as the first node and the distributed unit of the anchor node as the second node as an example, in the first configuration request message of the above step 1, it is assumed that for the first type of user data, the information contained in the message may include:

information related to user data profile (such as DRB ID=1, UE ID=1, type indication=DRB), profile indication information of user data (such as 1), and information related to the destination reception node (such as IP1).

It is assumed that for the second type of user data, the information contained in this message may include:

information related to user data profile (such as DRB ID=2, UE ID=1, type indication=DRB), profile indication information of user data (such as 2), and information related to the destination reception node (such as IP1).

Step 2: the second node may confirm that both DRB1 and DRB2 requested in Step 1 are accepted.

It is assumed that in the actual process of data transmission, the distributed unit of the anchor node will receive data packet 1 and data packet 2; in the header information of data packet 1, the DSCP/flow label will be set to 1, i.e., the profile indication information of user data is 1; in the header information of the data packet, the DSCP/flow label is set to 2, that is, the profile indication information of the user data is 2. In this way, the distributed unit of the anchor node may distinguish the type of the user data to which the data packet belongs, according to the DSCP/flow label or according to the DSCP/flow label and other information in the data packet.

For the information configuration method provided in the embodiment of the present disclosure, the method is described below with the second node as the execution subject of the method. As shown in FIG. 4, the information configuration method may include:

The second node may receive a first configuration request message transmitted by a first node; and The second node may transmit a first configuration response message to the first node according to the first configuration request message.

Optionally, according to the foregoing description, the first node and the second node may include any of the following:

the first node is the CU of the anchor node, and the second node is the DU of the anchor node, another base station, or the CU of another base station;

the first node is the CU-CP of the anchor node, and the second node is the CU-UP of the anchor node, the DU of the anchor node, another base station, or the CU of another base station; and the first node is another base station or a CU of another base station, the second node is a CU of an anchor node or a CU-CP of the anchor node.

Alternatively, the first configuration request message may carry information related to user data that the first node expects or request to be accepted by the second node, and the first configuration request message may include at least one of the following:

information related to data profile;
profile indication information of the user data;
information related to the destination reception node;
information related to the source transmission node; and
information related to the data transmission path.

The first configuration response message may carry information related to user data accepted by the second node, and the first configuration response message may include at least one of the following:

information related to data profile;
profile indication information of the user data;
information related to the source transmission node;
information related to the destination reception node; and
information related to the data transmission path.

Optionally, the method may further include: transmitting the third configuration request message to the fourth node; and receiving the third configuration response message, which is fed back by the fourth node based on the third configuration request message.

It may be understood that the information configuration method described with the second node as the execution subject is essentially the same technical solution as the information configuration method described with the first node as the execution subject in the foregoing, but it is a description for the solution from a different perspective. For a detailed description of the information configuration method described with the second node as the execution subject and an explanation of the solution, reference may be made to the description of the information configuration method when the first node is used as the execution subject, which is not repeated here.

In the foregoing information configuration method provided in the embodiment of the present disclosure, in actual applications, the two steps in the method may have different implementations. In order to better explain the method, the method is further described below in combination with different implementations in specific examples.

Example 1

In this example, it is described as an example that the first node is the central unit of the anchor node, the second node is the distributed unit of the anchor node, the third node is the another base station or the CU of the another base station, and the profile indication information of the user data is the determined (or configured) by the central unit of the anchor node.

Figure 5A:
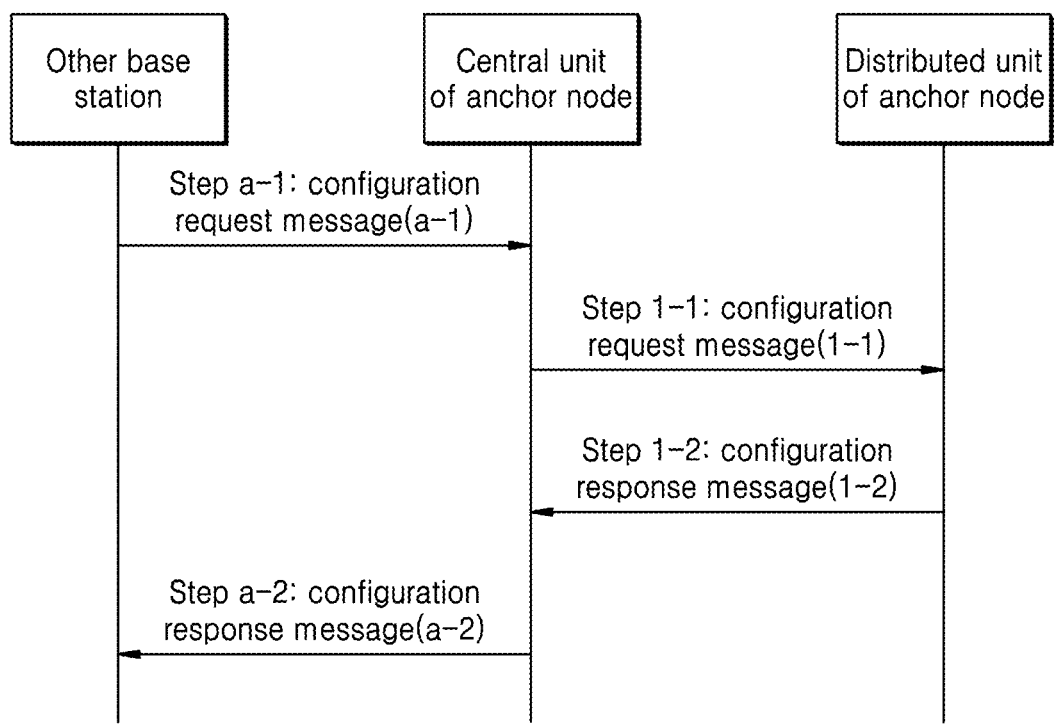
FIGS. 5a and 5b illustrate schematic flowcharts of information configuration methods according to an embodiment of the present disclosure.
Figure 5B:
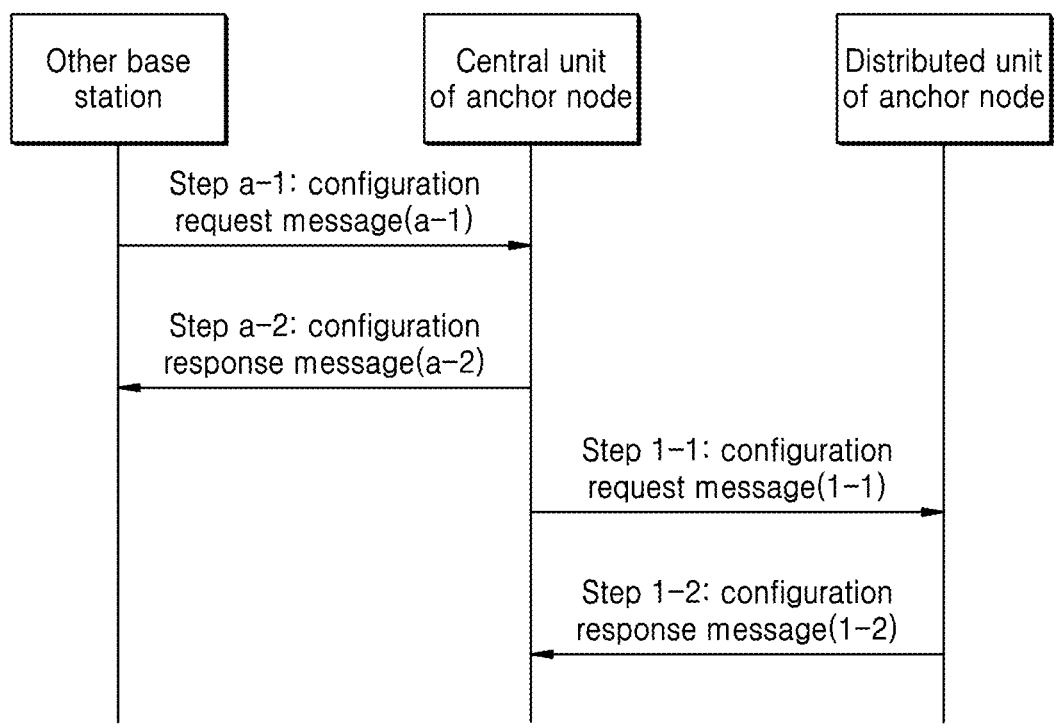

FIGS. 5a and 5b illustrate schematic flowcharts of information configuration methods according to an embodiment of the present disclosure.

As shown in FIG. 5a or FIG. 5b, the signaling interaction process of the information configuration method shown in this example may include the following steps.

Step 1-1: the central unit of the anchor node may transmit the first configuration request information (the configuration request message 1-1) to the distributed unit of the anchor node, and for one type of user data (the user data may be transmitted by the other base station or the central unit of the anchor to the accessing relay node of the user through the distributed unit of the anchor node, and the type of the data has a particular profile, which the particular profile is indicated by the information included in the configuration request message 1-1), the user data may be a newly added user data, that is, newly added data that needs to be transmitted by the distributed unit, or may be data that has been transmitted by the distributed unit. In addition to the profile indication information of the user data, the message may include at least one of the following information:

information related to user data profile
information related to the source transmission node
information related to the destination reception node
information related to the user data transmission path Step 1-2: the distributed unit of the anchor node may transmit the first configuration response information (configuration response message 1-2) corresponding to the request information of step 1-1 to the central unit of the anchor node.

The message in step 1-2 may be used to confirm the information received by the distributed unit of the anchor node in step 1-1. Optionally, for one type of user data (in an implementation manner, the user data is user data accepted by the distributed unit of the anchor node), the message may include at least information related to user data profile.

Optionally, in the above step 1-1, the first configuration request information may be transmitted by the control plane part (CU-CP) of the central unit of the anchor node to the user plane part (CU-UP) of the central unit of the anchor node, and in the above steps 1-2, the first configuration response information may be transmitted by the user plane part (CU-UP) of the central unit of the anchor node to the control plane part (CU-CP) of the central unit of the anchor node.

Optionally, the configuration request message 1-1 may also indicate a type of user data that needs to be removed, and the profile of the removed user data may be indicated by one or more pieces of the information included in the configuration request message in the above step 1-1, for example, the profile may be indicated by one or more of the information related to the user data profile, the profile indication information of the user data, the information related to the source transmission node, the information related to the destination reception node, the information related to the user data transmission path, etc. After receiving the information, the distributed unit of the anchor node may determine how to process the type of user data that has been removed, for example, the type of user data may no longer be transmitted on a backhaul link channel.

Optionally, when a user data packet is transmitted by another base station (such as base station 1) or a central unit of another base station (such as the central unit of base station 1), for example, a user data packet may be transmitted by another base station to a distributed unit of an anchor node, as shown in FIG. 5a or FIG. 5b, the signaling interaction process in this example further includes the following steps:

Step a-1: the base station 1 (or the central unit of the base station 1) may transmit the second configuration request information (the configuration request message a-1) to the central unit of the anchor node, and for one type of user data (the user data is transmitted by the base station to the distributed unit of the anchor node), the message may include information about the type of user data;

Step a-2: the central unit of the anchor node (or the control plane part of the central unit of the anchor node) may transmit a second configuration response information (configuration response message a-2 shown in the figure) corresponding to the configuration request message in step a-1 to the base station 1 (or the central unit of the base station 1), and for one type of user data (in an implementation manner, the user data may be accepted by the central unit of the anchor node), the message may include at least one of the following information:

information related to user data profile
profile indication information of the user data
information related to the destination reception node Optionally, as shown in FIG. 5a, the above step a-2 may be that the profile indication information (the indication information of the profile of the user data accepted by the distributed unit) of the user data negotiated in the central unit of the anchor node and the distributed unit of the anchor node in steps 1-1 and 1-2 is transmitted to other base stations, and the user data targeted by the profile indication information for the user data is transmitted by the other base stations to the distributed unit of the anchor node.

It should be noted that, in actual applications, the above steps 1-1/1-2 and steps a-1/a-2 may be performed separately or in combination. For example, if the steps are performed in combination, any performing order may be adopted, wherein in one embodiment it is step a-1→step 1-1→step 1-2→step a-2 (as shown in FIG. 5a), and in another embodiment it is step a-1→step a-2→step 1-1→step 1-2 (as shown in FIG. 5b).

Example 2

In this example, it is described as an example that the first node is the central unit of the anchor node, the second node is the distributed unit of the anchor node, the third node is the other base station or the CU of the other base station, and the profile indication information of the user data is the configured by the distributed unit of the anchor node.

Figure 6:
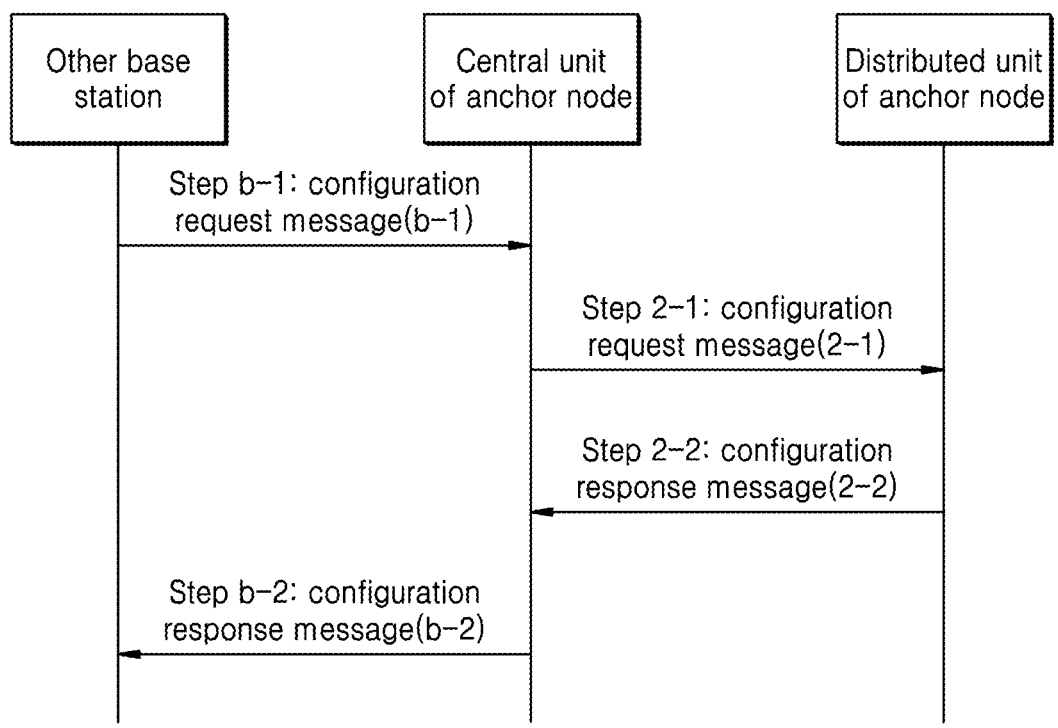
FIG. 6 illustrates a schematic flowchart of an information configuration method according to an embodiment of the present disclosure.

FIG. 6 illustrates a schematic flowchart of an information configuration method according to an embodiment of the present disclosure.

As shown in FIG. 6, the signaling interaction process of the information configuration method shown in this example may include:

Step 2-1: the central unit of the anchor node may transmit the first configuration request information (the configuration request message 2-1) to the distributed unit of the anchor node, and for one type of user data (the user data may be transmitted by the other base station or the central unit of the anchor to the accessing relay node of the user through the distributed unit of the anchor node, and the type of the data may have a particular profile, which the particular profile is indicated by the information included in the configuration request message 2-1), the user data may be a newly added user data, that is, the newly added data that needs to be transmitted by the distributed unit, or may be data that has been transmitted by the distributed unit. The message may include at least one of the following information:

information related to user data profile
information related to the source transmission node
information related to the destination reception node
information related to the user data transmission path Step 2-2: the distributed unit of the anchor node may transmit the first configuration response information (configuration response message 2-2) to the central unit of the anchor node. For one type of user data (in an implementation manner, the user data may be user data accepted by the distributed unit of the anchor node), in addition to the profile indication information for the user data, the message may include at least information:

information related to user data profile
information related to the source transmission node
information related to the destination reception node
information related to the user data transmission path Optionally, when the first node is the CU-CP of the anchor node and the second node is the CU-UP of the anchor node, taking as an example that the profile indication information of the user data is configured by the CU-UP of the anchor node, in the above step 2-1, the first configuration request information may be transmitted by the control plane part (CU-CP) of the central unit of the anchor node to the user plane part (CU-UP) of the central unit of the anchor node, and in the above step 2-2, the first configuration response information may be transmitted by the user plane part (CU-UP) of the central unit of the anchor node to the control plane part (CU-CP) of the central unit of the anchor node.

Optionally, the configuration request message 2-1 may also indicate a type of user data that needs to be removed, and the profile of the removed user data may be indicated by one or more pieces of the information included in the configuration request message in the above step 2-1, for example, the profile may be indicated by one or more of the information related to the user data profile, the profile indication information of the user data, the information related to the source transmission node, the information related to the destination reception node, the information related to the user data transmission path, etc. After receiving the information, the distributed unit of the anchor node may determine how to process the type of user data that has been removed, for example, the type of user data may no longer be transmitted on a backhaul link channel.

Optionally, when a user data packet is transmitted by another base station (such as base station 1) or a central unit of another base station (such as central unit of base station 1), for example, a user data packet may be transmitted by another base station to a distributed unit of an anchor node, as shown in FIG. 6, the signaling interaction process in this example may further include the following steps:

Step b-1: the base station 1 (or the central unit of the base station 1) may transmit the second configuration request information (the configuration request message b-1) to the central unit of the anchor node, and for one type of user data (in one implementation, the user data may be transmitted by another base station to the distributed unit of the anchor node), the message may include at least one of the following information:

information related to user data profile
information related to the source transmission node
information related to the destination reception node Step b-2: the central unit of the anchor node may transmit a second configuration response information (configuration response message b-2 shown in the figure) to the base station 1 (or the central unit of the base station 1), and for one type of user data (in an implementation manner, the user data is accepted by the central unit of the anchor node), in addition to the profile indication information of the user data, the message may include at least one of the following information:

information related to user data profile
information related to the source transmission node
information related to the destination reception node Optionally, the above step b-2 may be that the profile indication information of the user data determined in step 2-2 is transmitted to other base stations, and the user data targeted by the profile indication information for the user data may be transmitted by the other base stations to the distributed unit of the anchor node.

It should be noted that, in actual applications, the above steps 2-1/2-2 and steps b-1/b-2 may be performed separately or in combination according to actual requirements. For example, if the steps are performed in combination, any performing order may be adopted, wherein in one embodiment, it is step b-1→step 2-1→step 2-2→step b-2 (as shown in FIG. 6).

Example 3

In this example, it is taking as an example that the first node is an another base station, the second node is a central unit of the anchor node, the fourth node is a distributed unit of the anchor node, and the profile indication information for user data is configured by other base stations.

Figure 7:
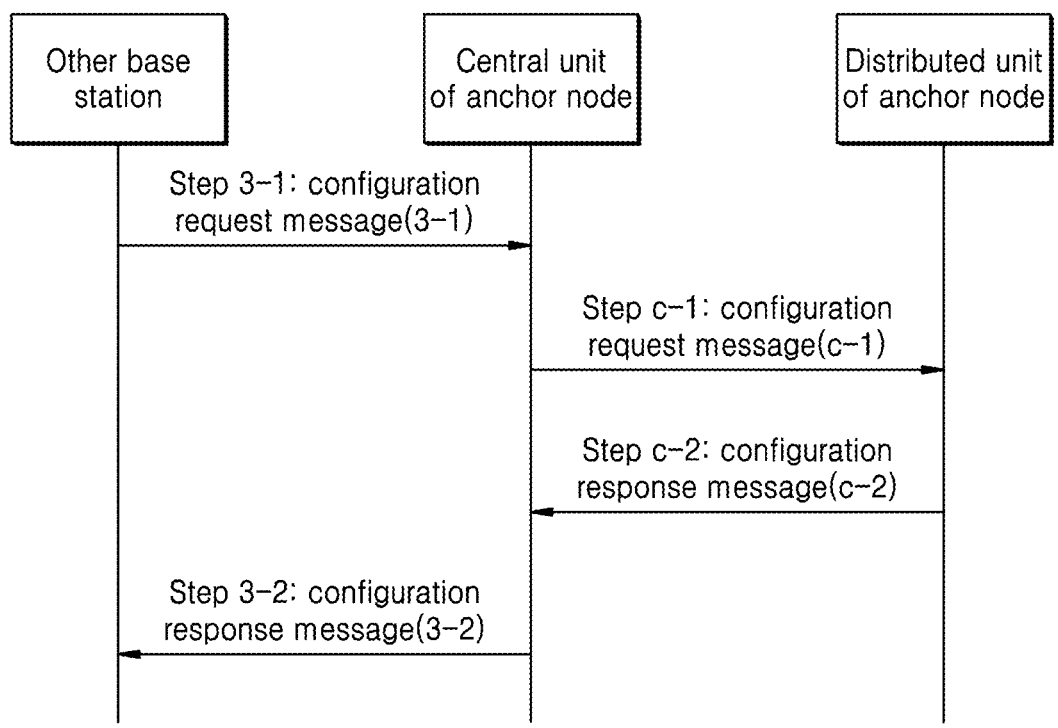
FIG. 7 illustrates a schematic flowchart of an information configuration method according to an embodiment of the present disclosure.

FIG. 7 illustrates a schematic flowchart of an information configuration method according to an embodiment of the present disclosure.

As shown in FIG. 7, the signaling interaction process of the information configuration method shown in this example may include:

Step 3-1: the other base stations may transmit the first configuration request information (the configuration response message 3-1) to the central unit of the anchor node, and for one type of user data (the user data may be transmitted by the other base station or the central unit of the anchor to the accessing relay node of the user through the distributed unit of the anchor node, and the type of the data may have a particular profile, where the particular profile may be indicated by the information included in the configuration request message 3-1), the user data may be a newly added user data, that is, the newly added data that needs to be transmitted by the distributed unit, or may be data that has been transmitted by the distributed unit. In addition to the profile indication information for the user data, the message may include at least one of the following information:

information related to user data profile
information related to the source transmission node
information related to the destination reception node Wherein, since the information related to the user data packet transmission path is generally controlled or allocated by the central unit of the anchor node, the request information may not include the information related to the user data packet transmission path. Certainly, if the other nodes know the information related to the user data packet transmission path, the request information may also include the information.

Step 3-2: the central unit of the anchor node may transmit a first configuration response information (the configuration response message 3-2) to the other base station, which the message is used for confirming the information transmitted in step 3-1, and optionally, for one type of user data (in an implementation manner, the user data may be accepted by the central unit of the anchor node), the message may include the information related to user data profile.

Optionally, the configuration request message 3-1 may also indicate a type of user data that needs to be removed, and the profile of the removed user data may be indicated by one or more pieces of the information included in the configuration request message in the above step 3-1, for example, the profile may be indicated by one or more of the information related to the user data profile, the profile indication information for the user data, the information related to the source transmission node, the information related to the destination reception node, the information related to the user data transmission path, etc. After receiving the information, the central unit of the anchor node may determine how to process the type of user data that has been removed, for example, to configure, e.g., in step c-1, that the type of user data may no longer be transmitted on a backhaul link channel.

Optionally, as shown in FIG. 7, the following interaction process may be further included between the central unit of the anchor node and the distributed unit of the anchor node in this example:

step c-1: the central unit of the anchor node may transmit the second configuration request information (the configuration request message c-1) to the distributed unit of the anchor node, and for one type of the user data (the user data may be transmitted by the other base station or the central unit of the anchor node, and be transmitted through the distributed unit of the anchor node to the relay node accessed by the user), the message may include at least one of the following information:

information related to user data profile
profile indication information of the user data
information related to the source transmission node
information related to the destination reception node
information related to the user data transmission path Step c-2: the distributed unit of the anchor node may transmit the second configuration response information (the configuration response message c-2 shown in the figure) to the central unit of the anchor node, where the message may be used for confirming the information transmitted in step c-1. Optionally, for one type of user data (in an implementation manner, the user data may be user data accepted by the distributed unit of the anchor node), the message may include the information related to user data profile.

Optionally, the above step c-1 may be that the profile indication information of the user data determined by other base stations in step 3-1 is transmitted to the distributed unit the anchor node.

Optionally, in the above step c-1, the second configuration request information may be transmitted by the control plane part (CU-CP) of the central unit of the anchor node to the user plane part (CU-UP) of the central unit of the anchor node, and in the above steps c-2, the second configuration response information may be transmitted by the user plane part (CU-UP) of the central unit of the anchor node to the control plane part (CU-CP) of the central unit of the anchor node.

It should be noted that, in actual applications, the above steps 3-1/3-2 and steps c-1/c-2 may be performed separately or in combination. For example, if the steps are performed in combination, any performing order may be adopted, wherein in one embodiment, it is step 3-1→step c-1→step c-2→step 3-2 (as shown in FIG. 7).

Example 4

In this example, it is described as an example that the first node is the central unit of the anchor node, the second node is the distributed unit of the anchor node, the third node is the other base station or the CU of the other base station, and the profile indication information of the user data is the configured by the source transmission node of the user data packet.

Figure 8A:
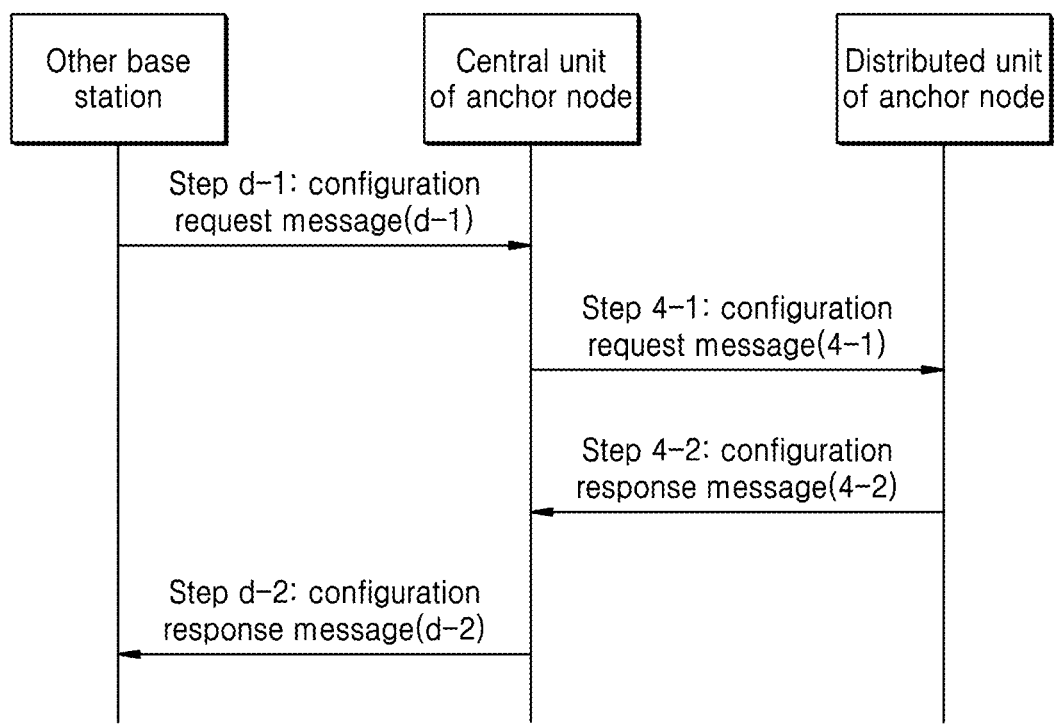
FIGS. 8a and 8b illustrate schematic flowcharts of information configuration methods according to an embodiment of the present disclosure.
Figure 8B:
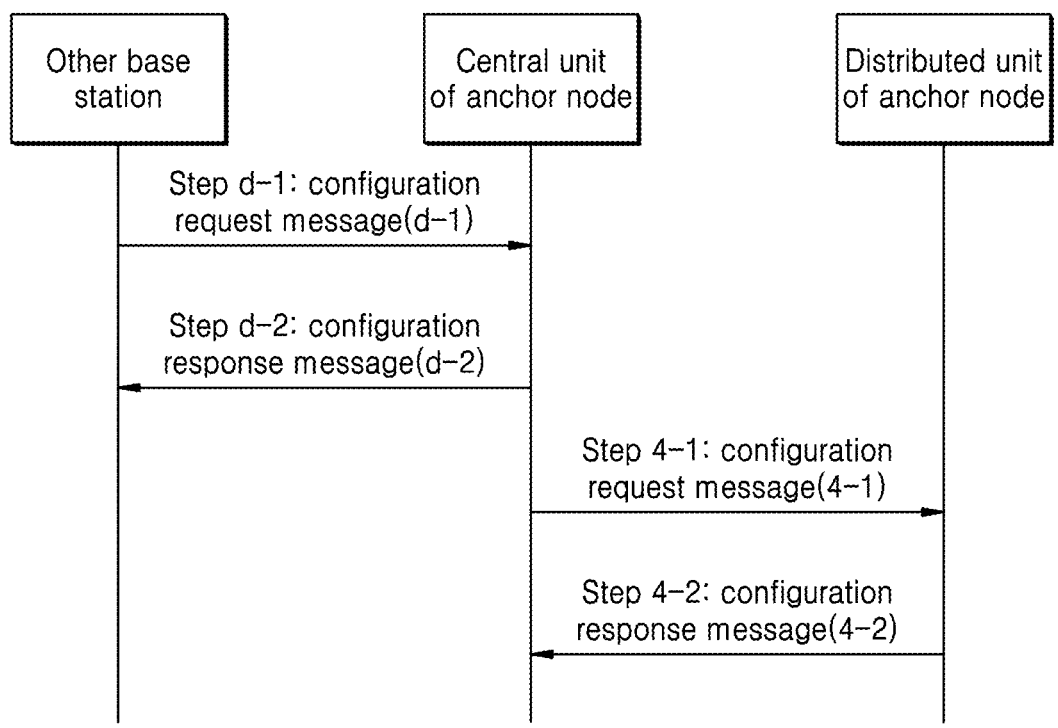

FIGS. 8a and 8b illustrate schematic flowcharts of information configuration methods according to an embodiment of the present disclosure.

As shown in FIG. 8a or FIG. 8b, the signaling interaction process of the information configuration method shown in this example may include:

Step 4-1: the central unit of the anchor node may transmit the first configuration request information (the configuration request message 4-1) to the distributed unit of the anchor node, and for one type of user data (the user data may be transmitted by the other base station or the central unit of the anchor to the relay node accessed by the user through the distributed unit of the anchor node, and the type of the data may have a particular profile, where the particular profile may be indicated by the information included in the configuration request message 4-1), the user data may be a newly added user data, that is, the newly added data that needs to be transmitted by the distributed unit, or may be data that has been transmitted by the distributed unit. The message may include at least one of the following information:
  information related to user data profile
  the profile indication information of the user data, wherein if the source transmission node of the user data is the central unit of the anchor node, the indication information may be generated by a central unit of the anchor node, and if the source transmission node of the user data is the other base station, the indication information may be generated by the other base station and transmitted to the central unit of the anchor node, for example, being transmitted to the central unit of the anchor node through step d-1 below.
  information related to the source transmission node
  information related to the destination reception node
  information related to the user data transmission path Step 4-2: the distributed unit of the anchor node may transmit the first configuration response information (the configuration response message 4-2) to the central unit of the anchor node. The message may be used to confirm the information received by the distributed unit of the anchor node in step 4-1. Optionally, for one type of user data (in an implementation manner, the user data is user data accepted by the distributed unit of the anchor node), the message may at least include the information related to user data profile.

Optionally, the configuration request message 4-1 may also indicate a type of user data that needs to be removed, and the profile of the removed user data may be indicated by one or more pieces of the information included in the configuration request information in the above step 4-1, for example, the profile may be indicated by one or more of the information related to the user data profile, the profile indication information for the user data, the information related to the source transmission node, the information related to the destination reception node, the information related to the user data transmission path, etc. After receiving the information, the distributed unit of the anchor node may determine how to process the type of user data that has been removed, for example, the type of user data may no longer be transmitted on a backhaul link channel.

Optionally, in the above step 4-1, the first configuration request information may be transmitted by the control plane part (CU-CP) of the central unit of the anchor node to the user plane part (CU-UP) of the central unit of the anchor node, and in the above step 4-2, the first configuration response information may be transmitted by the user plane part (CU-UP) of the central unit of the anchor node to the control plane part (CU-CP) of the central unit of the anchor node. Optionally, when the user data is transmitted by another base station (such as base station 1) or a central unit of another base station (such as central unit of base station 1), for example, the user data may be transmitted by another base station or the central unit of another base station to the distributed unit of an anchor node, as shown in FIG. 8a or FIG. 8b, the signaling interaction process in this example may further include the following steps:

Step d-1: the base station 1 (or the central unit of the base station 1) may transmit the second configuration request information (the configuration request message d-1) to the central unit of the anchor node, and for one type of user data (the user data may be transmitted by the base station and may be transmitted through the distributed unit of the anchor node to the relay node accessed by the user), the message may include at least one of the following information:
  information related to user data profile
  profile indication information of the user data
  information related to the source transmission node
  information related to the destination reception node Step d-2: the central unit of the anchor node may transmit the second configuration response information (the configuration response message d-2) to base station 1, where the message may be used to confirm that the message in step d-1 is received. Optionally, for one type of user data (in an implementation manner, the user data may be user data accepted by the central unit of the anchor node), the message may at least include the information related to user data profile.

Wherein, for a more specific description of steps d-1 and d-2 in this example, reference may be made to the corresponding descriptions of steps a-1 and a-2 in example 1 above.

It should be noted that, in actual applications, the above steps 4-1/4-2 and steps d-1/d-2 may be performed separately or in combination. For example, if the steps are performed in combination, any performing order may be adopted, wherein in one embodiment, it is step d-1→step 4-1→step 4-2→step d-2 (as shown in FIG. 8a), and in another embodiment, it is step d-1→step d-2→step 4-1→step 4-2 (as shown in FIG. 8b).

The effect of the above four examples lies in how the nodes in the network (such as the central unit of the anchor node or the user plane part CU-UP of the central unit of the anchor node, other base stations or the central units of other base stations) add the information related to the user data profile into the data packet when transmitting data, which also avoids adding the same information to two types of data with different profiles. Meanwhile, the node receiving the data (such as the distributed unit of the anchor node) may also learn the information contained in the received data packet according to the configuration information described above, transmit the information to other nodes, and transmit the data correctly, for example, transmitting the corresponding user data with the configured backhaul link, thereby ensuring the transmission and routing of user data in the relay network.

In the embodiment of the first aspect of the present disclosure, another base station or a distributed unit of the anchor node or the central unit of the anchor node (or a control plane part CU-CP of the central unit) may be required to learn the information related to the source transmission node and/or the destination reception node of the user data (that is, the user's accessing relay node). However, each node for serving user data in the existing relay network cannot obtain information related to the source transmission node of the user data (such as address information, identification information, port information, etc.) and information related to the destination reception node (accessing relay node) (such as address information, identification information, port information, etc.), that is, the problems in the second aspect described above in the prior art. To address this problem, the second aspect of the embodiments of the present disclosure also provides an information interaction method. The method may obtain the information related to the source transmission node and/or the destination reception node of the user data through the signaling interaction of the network nodes. The signaling interaction process of this solution may mainly involve two nodes, which are referred to as a fifth node and sixth node in the embodiments of the present disclosure for the purpose of description. The method provided in the embodiments of the present disclosure is described in detail below.

Figure 9:
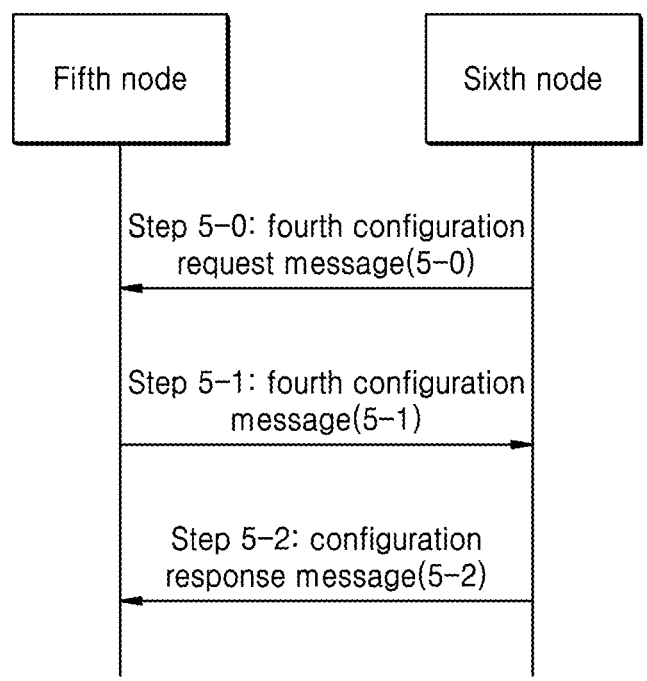
FIG. 9 illustrates a schematic flowchart of an information interaction method according to an embodiment of the present disclosure.

FIG. 9 illustrates a schematic flowchart of an information interaction method according to an embodiment of the present disclosure. The method is described below with the fifth node as the execution subject of the method.

As shown in FIG. 9, the method may include:

Step 5-1: the fifth node may transmit a fourth configuration message (the fourth configuration message 5-1) to the sixth node.

Wherein the fourth configuration message is used for performing interaction, between the fifth node and the sixth node, with information related to the source transmission node and/or the destination reception node of the user data.

Based on the method in the embodiment of the present disclosure, the fifth node may transmit the obtained information related to the source transmission node or destination reception node of the user data to the sixth node, by transmitting the node configuration information to the six node, to enable the sixth node to obtain the information related to the source transmission node and/or the destination reception node of the user data known by the fifth node.

Optionally, the fifth node and the sixth node may be at least one of the following:
 the fifth node is the CU of the anchor node, and the sixth node is the DU of the anchor node, another base station, or the CU of another base station;
 the fifth node is another base station or the CU of another base station, and the sixth node is the CU of the anchor node; and
 the fifth node is the DU of the anchor node, and the sixth node is the CU of the anchor node.

Optionally, the fourth configuration message may include at least one of the following:
 user identification information;
 information related to the data profile (i.e., information about the profile of the user data); and
 information related to the source transmission node and/or information related to the destination reception node.

Wherein, the identification information of the user may be identification information of a user whose user data needs to be transmitted, for downlink data, the identification information of the user may be identification information of a UE that receives the user data, and for uplink data, the identification information of the user may be identification information of a UE that transmits the user data.

It may be understood that the information related to the source transmission node and/or the destination reception node among the information carried in the fourth configuration message is information related to the node known by the fifth node. For example, the fifth node knows information related to the destination reception node of the user data that needs to be transmitted, and the node configuration information may include the information related to the destination reception node.

Optionally, as shown in FIG. 9, the fifth node may transmit a fourth configuration message to the sixth node, which may specifically include:

Step 5-0: receiving a fourth configuration request message (the configuration request message 5-0) transmitted by the sixth node; and Step 5-1: transmitting a fourth configuration message to the sixth node based on the node configuration request information.

That is, before the fifth node transmits the fourth configuration message to the sixth node, the fifth node may also receive the fourth configuration request message transmitted by the sixth node. The sixth node may transmit the fourth configuration request message to the fifth node to learn from the fifth node the information related to the source transmission node and/or the destination reception node of the user data that needs to be transmitted, and the fifth node may inform the known information related to the source transmission node and/or the destination reception node of the user data, through feeding back the corresponding node configuration information to the sixth node, after the fifth node receiving the node configuration request.

Optionally, the fourth configuration request message may include at least one of the following:
 user identification information; information related to data profile; or information related to the source transmission node or information related to the destination reception node.

Wherein, the information related to the source transmission node or the destination reception node carried in the fourth configuration request message may be the information related to the source transmission node or the destination reception node of the user data packet, known by the sixth node that needs to be transmitted. That is, when transmitting the node configuration request information to the fifth node, the sixth node may also inform the fifth node of the known information related to the node (source transmission node or destination reception node).

Optionally, one of the fourth configuration request message and the fourth configuration message may not include the information related to the same node, and the same node may be a source transmission node or a destination reception node.

Optionally, as shown in FIG. 9, after the fifth node transmits a fourth configuration message to the sixth node, the method may specifically include:

Step 5-3: receiving the configuration acknowledge message transmitted by the sixth node based on the node configuration information, that is, the response message of the fourth configuration message (the configuration response message 5-2).

After receiving the fourth configuration message transmitted by the fifth node, the sixth node may feed back configuration acknowledge information to the fifth node to confirm that the fourth configuration message transmitted by the fifth node in step 5-1 has been received. Wherein, the specific form of the acknowledge information carried in the configuration acknowledge message (that is, a message for informing the fifth node that the node configuration information has been received) is not limited in the embodiment of the present disclosure, for example, it may be an agreed form between nodes, or the form of acknowledge information pre-defined by the system.

Optionally, the configuration acknowledge message includes at least one of the following: user identification information; information related to data profile; or information related to the source transmission node or information related to the destination reception node.

Similarly, the information related to the source transmission node or the destination reception node in the acknowledge message may be the information related to the source transmission node or the destination reception node known by the sixth node.

Optionally, one of the fourth configuration message and the configuration acknowledge message may not include information related to the same node, and the same node may be a source transmission node or a destination reception node.

In actual applications, the messages (such as the fourth configuration request message, the fourth configuration message, and the configuration acknowledge message) used in the processes of the information interaction method provided in the foregoing embodiments of the present disclosure may be the existing X2/Xn/F1 interface messages, or may also be newly defined messages.

An effect of the information interaction method provided in the embodiment of the present disclosure is that each node for serving user data may obtain information related to a source transmission node and/or a destination reception node (that is, an accessing relay node) of the user data, which may be convenient for adding different relevant indication information for different data packets of user data, so that the distributed unit of the anchor node may distinguish different types of user data, for example, distinguishing different types of user data according to one or more of profile indication information for the user data, information related to user data profile, the information related to the source transmission node of the user data and the information related to the destination reception node of the user data, and to determine, according to these information, how to perform transmission of the user data, for example, to determine the backhaul link channel used for transmitting the user data.

The following uses the sixth node as the execution subject of the information interaction method to describe the information interaction method provided in the embodiment of the present disclosure. Specifically, referring to FIG. 9, the information interaction method may include:

receiving a fourth configuration message transmitted by a fifth node, wherein the fourth configuration message may be used for performing interaction, between the fifth node and the sixth node, with information related to the source transmission node and/or the destination reception node of the user data.

Optionally, the fifth node and the sixth node may be at least one of the following:

the fifth node is the CU of the anchor node, and the sixth node is the DU of the anchor node, another base station, or the CU of another base station;

the fifth node is another base station or the CU of another base station, and the sixth node is the CU of the anchor node; and the fifth node is the DU of the anchor node, and the sixth node is the CU of the anchor node.

Optionally, the fourth configuration message may include at least one of the following: user identification information; information related to data profile; or information related to the source transmission node and/or information related to the destination reception node.

Optionally, the above transmitting the fourth configuration message to the sixth node, may specifically include: receiving the fourth configuration request message transmitted by the sixth node; and transmitting a fourth configuration message to the sixth node based on the node configuration request information.

Optionally, the fourth configuration request message may include at least one of the following: user identification information; information related to data profile; information related to the source transmission node; or information related to the destination reception node.

Similarly, the information interaction method described with the sixth node as the execution subject is essentially the same technical solution as the information interaction method described with the fifth node as the execution subject in the foregoing, but it is a description for the solution from a different perspective. For a detailed description of the information interaction method described with the sixth node as the execution subject and an explanation of the solution, reference may be made to the description of the information configuration method when the fifth node is used as the execution subject, which is not repeated here.

In order to better explain the information interaction method provided by the embodiments of the present disclosure, the method is further described below in combination with specific examples.

Example 1

In this example, the fifth node is the central unit of the anchor node, and the sixth node is the other base station or the central unit of other base station, wherein the central unit of the anchor node may know the information related to the destination reception node, and the other base station or the central unit of other base station may know the information related to the source transmission node. The signaling interaction process of the information interaction method in this example may mainly include the following steps.

Step 5a-1: the central unit of the anchor node may transmit a fourth configuration message 5a-1 to other base stations (or the central units of other base stations), wherein, in addition to the information related to the destination reception node, the message may include at least one of the following information:

user identification information information related to user data profile

Optionally, before step 5a-1, the method may further include:

Step 5a-0: other base stations (or the central units of other base stations) may transmit the fourth configuration request message 5a-0 to the central unit of the anchor node, wherein, in addition to the information related to the source transmission node, the message may include at least one of the following information:

user identification information information related to user data profile

Optionally, after step 5a-1, the method may further include:

Step 5a-2: the other base stations (or the central unit of the other base stations) may transmit a node configuration acknowledge message 5a-2 to the central unit of the anchor node to confirm that the message transmitted in step 5a-1 is received, wherein, in addition to the information for confirming that the message transmitted in step 5a-1 is received, optionally, the acknowledge message may further include at least one of the following information:

user identification information information related to user data profile information related to the source transmission node Through the solution provided in this example, the interaction of the information related to the source transmission node and/or the information related to the destination reception node of the user data between the central unit of the anchor node and other base stations (or the central unit of other base station) may be completed, and therefore, both the central unit of the anchor node and the other base stations (or the central unit of other base stations) are enabled to learn the information related to the source transmission node and the information related to the destination reception node.

Example 2

In this example, the fifth node is the central unit of the anchor node and the sixth node is the distributed unit of the anchor node, wherein the central unit of the anchor node knows the information related to the source transmission node and/or the information related to the destination reception node, and the distributed unit of the anchor node knows the information related to the destination reception node. The signaling interaction process of the information interaction method in this example may mainly include the following steps:

Step 5b-1: the central unit of the anchor node may transmit the fourth configuration message 5b-1 to the distributed unit of the anchor node, wherein in addition to the information related to the source transmission node and/or information related to the destination reception node, the message may include at least one of the following information:

user identification information information related to user data profile

Optionally, before step 5b-1, the method may further include:

Step 5b-0: the distributed unit of the anchor node may transmit a fourth configuration request message 5b-0 to the central unit of the anchor node, and the message may include at least one of the following information:

user identification information information related to user data profile information related to the destination reception node Optionally, after step 5b-1, the method may further include:

Step 5b-2: the distributed unit of the anchor node may transmit a node configuration acknowledge message 5b-2 to the central unit of the anchor node to confirm that the message transmitted in step 5b-1 is received, wherein, in addition to the information for confirming that the message transmitted in step 5b-1 is received, optionally, the acknowledge message may also include at least one of the following information:

user identification information information related to user data profile information related to the destination reception node It may be understood that, when the fourth configuration request message 5b-0 includes information related to the destination reception node, the fourth configuration message 5b-1 may be not required to include information related to the destination reception node. When the information related to the destination reception node is not included in the fourth configuration request message 5b-0, the fourth configuration message 5b-1 may include the information related to the destination reception node. Similarly, when the fourth configuration message 5b-1 includes information related to the destination reception node, the node configuration acknowledge message 5b-2 may be not required to include the information related to the destination reception node. That is, in the above steps, the information related to the destination reception node will not be appeared in both step 5b-1 and step 5b-0 (or step 5b-2).

Example 3

In this example, the fifth node is the other base station (or the central unit of other base station) and the sixth node is the central unit of the anchor node, wherein the other base station (or the central unit of other base station) knows the information related to the source transmission node, and the central unit of the anchor node knows the information related to the destination reception node. The signaling interaction process of the information interaction method in this example may mainly include the following steps:

Step 5c-1: the other base station (or the central unit of other base station) may transmit the fourth configuration message 5c-1 to the central unit of the anchor node, wherein in addition to the information related to the source transmission node, the message may include at least one of the following information:

user identification information information related to user data profile

Optionally, before step 5c-1, the method may further include:

Step 5c-0: the central unit of the anchor node may transmit the fourth configuration request message 5c-0 to the other base station (or the central unit of other base station), wherein in addition to the information related to the destination reception node, the message may include at least one of the following information:

user identification information information related to user data profile

Optionally, after step 5c-1, the method may further include:

Step 5c-2: the central unit of the anchor node may transmit a node configuration acknowledge message 5c-2 to the other base station (or the central unit of the other base station) to confirm that the message transmitted in step 5c-1 is received, wherein, in addition to the information for confirming that the message transmitted in step 5c-1 is received, optionally, the acknowledge message may also include at least one of the following information:

user identification information
information related to user data profile
information related to the destination reception node Example 4

In this example, the fifth node is the central unit of the anchor node and the sixth node is the central unit of the anchor node, wherein the distributed unit of the anchor node knows the information related to the destination reception node, and the central unit of the anchor node knows the information related to the source transmission node. The signaling interaction process of the information interaction method in this example may mainly include the following steps:

Step 5d-1: the distributed unit of the anchor node may transmit the fourth configuration message 5d-1 to the central unit of the anchor node, wherein, in addition to the information related to the destination reception node, the message may include one of the following information:
user identification information
information related to user data profile
information related to the destination reception node
Optionally, before step 5d-1, the method may further include:
Step 5d-0: the central unit of the anchor node may transmit the fourth configuration request message 5d-0 to the distributed unit of the anchor node, wherein in addition to the information related to the source transmission node, the message may include at least one of the following information:
user identification information
information related to user data profile
Optionally, after step 5d-1, the method further includes:
Step 5d-2: the central unit of the anchor node may transmit a node configuration acknowledge message 5d-2 to the distributed unit of the anchor node to confirm that the message transmitted in step 5d-1 is received, wherein, in addition to the information for confirming that the message transmitted in step 5d-1 is received, optionally, the acknowledge message may further include at least one of the following information:
user identification information
information related to user data profile
information related to the source transmission node.

The third aspect of the present disclosure is to provide a method for updating address information of a relay node.

For the problem that when the address of the relay node for serving user changes, updating the GTP-U tunnel or TNL association for serving user will cause a large signaling overhead. The third aspect of this disclosure also provides a mechanism for quickly updating address information, that is, a method for updating address information of the relay node.

In addition, it should be noted that the update in the above-mentioned update method provided in the embodiment of the present disclosure may include the update (i.e., modification) of the address information, or may further include addition or deletion of the address information.

The above-mentioned relay node address changes may be due to the relay node changing the distributed unit of the anchor node to which it is connected (the connection may be a direct connection, or may be a connection through other nodes), or may be due to the relay node changing the central unit of the anchor node to which it is connected, or may be due to other reasons.

The addition or deletion of the relay node address may be due to that the relay node needs a new address to communicate with the anchor node, or the existing address is no longer used, or other reasons.

The embodiment of the present disclosure provides a method for updating address information of a relay node, which may include any one of the following:
Manner 1: a CU of the anchor node may transmit a first address update message to a relay node or a DU of the relay node;
Manner 2: the DU of the anchor node may transmit an address update notification message to the CU of the anchor node;
Manner 3: the relay node or the DU of the relay node may transmit an address update request message to the CU of the anchor node.

Wherein, for the above manner 1, the new address information of the relay node or the DU of the relay node may be allocated or configured by the central unit of the anchor node, and further, the new address may be obtained by the central unit of the anchor node from other nodes (such as OAM, distributed unit of anchor node, DHCP server, etc.); for the manner 2, the new address information of the relay node or the DU of the relay node may be allocated by the distributed unit of the anchor node; for the manner 3, the new address information of the relay node or the DU of the relay node is obtained by itself, for example, the relay node or the DU of the relay node may learn the new address information from the OAM or DHCP server, by the configuration of OAM or the allocation of DHCP server, etc.

In an optional embodiment of the present disclosure, the address update message, the address update notification message, or the address update request message may be an F1 Application Protocol (F1AP) message, or an RRC message, or other messages. The above messages may include at least one of the following information.

Identification information of the relay node or the DU of the relay node.

The (old) address information of the relay node or the DU of the relay node before update, which may be IP address information, and/or the newly defined address information (such as the backhaul adaptation layer address (BAP address)) representing the relay node or the DU of the relay node used when transmitting or receiving data on the backhaul link, and/or the port information, and/or the information about the prefix length of the IP address, wherein these address information may be used before update; further, when the message includes the address information before the update, the message may also include the indication information for indicating the purpose of the address information, for example, the indication information for transmitting control signaling (the indication information may indicate that the address indicated by the address information is used to transmit control signaling, such as a control signaling of the F1 interface), or the indication information for transmitting the user plane data (the indication information may indicate that the address indicated by the address information is used to transmit the user plane data, such as the user plane data of the F1 interface), or the indication information for both transmitting the control signaling and the user plane data.

The post-update (new) address information of the relay node or the DU of the relay node, which may be IP address information, and/or the newly defined address information (such as BAP address) representing the relay node or the DU of the relay node used when transmitting or receiving data on the backhaul link, and/or the port information, and/or the information about the prefix length of the IP address, wherein these address information may be used after update;

further, when the message includes the address information after the update, the message may also include the indication information for indicating the purpose of the address information, for example, the indication information for transmitting control signaling (the indication information may indicate that the address indicated by the address information is used to transmit control signaling, such as a control signaling of the F1 interface), or the indication information for transmitting the user plane data (the indication information may indicate that the address indicated by the address information is used to transmit the user plane data, such as the user plane data of the F1 interface), or the indication information for both transmitting the control signaling and the user plane data.

The newly added address information of the relay node or the DU of the relay node, which may be IP address information, and/or the newly defined address information (such as BAP address) representing the relay node or the DU of the relay node used when transmitting or receiving data on the backhaul link, and/or the port information, and/or the information about the prefix length of the IP address; further, this information may be included in the first address update message, or the address update request message, or the update notification message; further, when the message includes the newly added address information, the message may also include the indication information for indicating the purpose of the address information, for example, the indication information for transmitting control signaling (the indication information may indicates that the address indicated by the address information is used to transmit control signaling, such as a control signaling of the F1 interface), or the indication information for transmitting the user plane data (the indication information indicates that the address indicated by the address information is used to transmit the user plane data, such as the user plane data of the F1 interface), or the indication information for both transmitting the control signaling and the user plane data.

The address information of the relay node or the DU of the relay node that is required to be deleted, or released, or removed, which indicates that the relay node or the DU of the relay node no longer uses the address indicated by the information to communicate with the anchor node or the CU of the anchor node. The address information may be IP address information, and/or the newly defined address information (such as BAP address) representing the relay node or the DU of the relay node used when transmitting or receiving data on the backhaul link, and/or the port information, and/or the information about the prefix length of the IP address; further, this information may be included in the first address update message, or the address update request message, or the update notification message; in one embodiment, if the relay node or the DU of the relay node receives this information, then the relay node or the DU of the relay node may delete, or release, or remove the address indicated by the information, and no longer use the address indicated by the information to communicate with the anchor node or the CU of the anchor node; in another embodiment, if the anchor node or the CU of the anchor node receives this information, then the anchor node or the CU of the anchor node no longer uses the address indicated by the information to communicate with the relay node or the DU of the relay node; in another embodiment, if the DU of the anchor node receives the information, the DU of the anchor node learns that the relay node or the DU of the relay node no longer uses the address indicated by the information to communicate with the anchor node or the CU of the anchor node. The old address information of the anchor node (or the central unit of the anchor node or the distributed unit of the anchor node), may be IP address information, and/or the newly defined address information (such as BAP address) representing the anchor node or the CU of the anchor node used when transmitting or receiving data on the backhaul link, and/or the port information, and/or the information about the prefix length of the IP address, wherein the address information is the address information used for communicating with the relay node or the DU of the relay node before update.

The new address information of the anchor node (or the central unit of the anchor node or the distributed unit of the anchor node), which may be IP address information, and/or the newly defined address information (such as BAP address) representing the anchor node or the central unit of the anchor node used when transmitting or receiving data on the backhaul link, and/or the port information, and/or the information about the prefix length of the IP address, wherein the address information is the address information used for communicating with the relay node or the DU of the relay node after update.

The newly added information of the anchor node or the CU of the anchor node, which may be IP address information, and/or the newly defined address information (such as BAP address) representing the anchor node or the CU of the anchor node used when transmitting or receiving data on the backhaul link, and/or the port information, and/or the information about the prefix length of the IP address.

The address information of the anchor node or the CU of the anchor node that is required to be deleted, or released, or removed, which indicates that the anchor node or the CU of the anchor node no longer uses the address indicated by the information to communicate with the relay node or the DU of the relay node. The address information may be IP address information, and/or the newly defined address information (such as BAP address) representing the anchor node or the CU of the anchor node used when transmitting or receiving data on the backhaul link, and/or the port information, and/or the information about the prefix length of the IP address.

The new path identification information, which may correspond to a user's DRB (the user's DRB is a DRB of the user accessing the relay node or the distributed unit of the relay node), or correspond to the control signaling (such as a part or all of the F1AP signaling of the DU of the relay node or the relay node), wherein the path identification information represents a path when transmitting data between the anchor node (or the central unit of the anchor node) and the relay node (or the distributed unit of the relay node). This information is used after updating the IP address.

The indication information for requesting the new address information, for example, the new IP required indication, which is used for informing the CU of the anchor node to configure new address information to the relay node or the DU of the relay node; further, this information may be included only in the address update request message; in one embodiment, if the anchor node or the CU of the anchor node receives this information, then the anchor node or the CU of the anchor node may delete, or release, or remove the address indicated by the information, and no longer use the address indicated by the information to communicate with the relay node or the DU of the relay node; in another embodiment, if the relay node or the DU of the relay node receives this information, then the relay node or the DU of the relay node no longer uses the address indicated by the information to communicate with the anchor node or the CU of the anchor node; in another embodiment, if the DU of the anchor node receives the information, the DU of the anchor node learns that the relay node or the DU of the relay node no longer uses the address indicated by the information to communicate with the anchor node or the CU of the anchor node.

Indication information of the number of requested new address information, for example, the IP number, which is used to inform the CU of the anchor node to configure the number of new address information configured to the relay node or the DU of the relay node; further, the information may only be included in the address update request message; further, the indication information of the number may also indicate the number of the requested address information (such as an IP address) for a specific purpose, which may be used for transmitting the control signaling (the indication information of the number indicates the number of requested address information for transmitting control signaling (such as the control signaling of the F1 interface)), or transmitting the user plane data (the indication information of the number indicates the number of requested address information for user plane data (such as the user plane data with the F1 interface)), or transmitting both the control signaling and user plane data.

The address information requested to be updated, which is the address information currently used by the relay node or the DU of the relay node, may be IP address information, and/or the newly defined address information (such as BAP address) representing the anchor node or the CU of the anchor node used when transmitting or receiving data on the backhaul link, and/or the port information, and/or the information about the prefix length of the IP address; the address indicated by the address information is required to be updated; further, the information may be included only in the address update request message.

The address information requested to be deleted, or released and removed, which is the address information currently used by the relay node or the DU of the relay node, may be IP address information, and/or the newly defined address information (such as BAP address) representing the anchor node or the CU of the anchor node used when transmitting or receiving data on the backhaul link, and/or the port information, and/or the information about the prefix length of the IP address; further, the information may be included only in the address update request message.

The information about the address used when establishing the IPSec tunnel, includes at least one of the following information: 1) the address information used by the relay node or the distributed unit side of the relay node when establishing the IPSec tunnel, wherein the address information may be the IP address information, and/or the port information, and/or the prefix length information of the IP address; 2) the address information used by the anchor node or the central unit side of the anchor node when establishing the IPSec tunnel, wherein the address information may be the IP address information, and/or the port information, and/or the information about the prefix length of the IP address.

In an optional embodiment of the present disclosure, after the relay node or the DU of the relay node receives the first address update message, it may also include at least one of the following behaviors:

The relay node or the distributed unit of the relay node establishes the SCTP association or transport network layer association with the central unit of the anchor node, wherein the establishment of the association is for transmitting the F1AP message between the central unit of the anchor node and the relay node or the distributed unit of the relay node. Further, after the association is established, the distributed unit configuration update process may also be performed between the relay node or the distributed unit of the relay node and the central unit of the anchor node, and this process may refer to TS38.473.

The downlink address information of the user DRB served by the relay node or the DU of the relay node (the user's DRB is a DRB of the user accessing the relay node or the DU of the relay node) is updated, for example, DL Transport Layer Information (GTP-U tunnel information), and may include IP address information and GTP-TEID information. The address information is address information of a relay node or a distributed unit side of the relay node. The IP address information in the downlink address information may be updated, or the entire downlink address information may be updated.

The uplink address information of the user DRB served by the relay node or the DU of the relay node (the user's DRB is a DRB of the user accessing the relay node or the DU of the relay node) is updated, for example, UL Transport Layer Information (GTP-U tunnel information), and may include IP address information and GTP-TEID information. The address information is address information of an anchor node or the central unit side of the anchor node. The IP address information in the uplink address information may be updated, or the entire uplink address information may be updated.

The relay node or the distributed unit of the relay node deletes the address information. When the first address update message received by the relay node or the distribution unit of the relay node contains the address information to be deleted by the distribution unit of the relay node or the relay node, the distribution unit of the relay node or the relay node can delete the corresponding address information based on the message.

The relay node or the distributed unit of the relay node adds new address information, which is used by the relay node or the distributed unit of the relay node to communicate with the anchor node or the central unit of the anchor node.

In an optional embodiment of the present disclosure, after the CU of the anchor node transmits the first address update message to the relay node or the DU of the relay node, the method may also include:

receiving a first address update acknowledge message transmitted by the relay node or the DU of the relay node.

Wherein, the first address update acknowledge message may be used to confirm that the relay node has adopted a new address.

The first address update message may be an F1AP message (such as a gNB-CU configuration update message or a new F1AP message), or an RRC message (such as an RRCReconfiguration message, a Handover Command message, or a new RRC message, such as a Transport Layer Address Configuration). The message may be transmitted to the distributed unit of the relay node, or it may be transmitted to the mobile terminal part of the relay node.

The effects of the foregoing embodiments include that when the address information of the relay node or the DU side of the relay node changes, it may update the downlink address information of the served user's DRB according to the received first address update message, and/or the uplink address information of the user's DRB, and/or the address information of the relay node or the DU side of the relay node when transmitting the control signaling (e.g., the UE-associated signaling, or non-UE associated signaling) to the anchor node or the CU of the anchor node, and/or the address information of the anchor node or the CU side of the anchor node when transmitting the control signaling (e.g., the UE-associated signaling, or non-UE associated signaling) to the anchor node or the CU of the anchor node. There is no need to, as in existing mechanisms, that the anchor node or the central unit of the anchor node transmits an address update message for each user's DRB to the relay node or the distributed unit of the relay node, that is, if there are 100 user's DRBs served by the relay node or the DU of the relay node, the anchor node or the central unit of the anchor node needs to transmit 100 messages to the relay node or the distributed unit of the relay node to update the address information of each user's DRB. The effects of this embodiment include that the signaling overhead of updating the address information when the relay node or the distributed unit of the relay node serves the user's DRB is saved.

Another effect of the above embodiment is that when the relay node or the DU side of the relay node obtains new address information, it may use the new address information to transmit and receive the control plane data or user plane data with the anchor node or the CU of the anchor node. When the relay node or the DU side of the relay node obtains the address information to be deleted, it may remove some addresses in use and save resources. In addition, by using the address update request message, the relay node or the DU of the relay node may request the CU of the anchor node to update (such as modify, add, delete, etc.) its address information.

Another effect of the above embodiment is that after the relay node or the DU of the relay node obtains information about the address used to establish the IPSec tunnel, it may use the information to establish the IPSec tunnel with the anchor node or the central unit of the anchor node.

In an optional embodiment of the present disclosure, after the DU of the anchor node transmits the address update notification message to the CU of the anchor node, the method may also include at least one of the following:
  receiving an update notification acknowledge message transmitted by the CU of the anchor node;
  transmitting, by the CU of the anchor node, a second address update message to a relay node or a DU of the relay node; and
  transmitting, by the CU of the anchor node, a second address update message to the relay node or the DU of the relay node, and receiving the second address update acknowledge message transmitted by the relay node or the DU of the relay node.

Wherein, the update notification acknowledge message may be used to confirm that the CU of the anchor node receives the updated address information. In addition, the CU of the anchor node may also transmit a second address update message to the relay node or the DU of the relay node to inform the relay node or the DU of the relay node of the new address information of the relay node or the DU of the relay node. Further, the CU of the anchor node may also receive the second address update acknowledge message, and the acknowledge information is used to confirm that the relay node or the DU of the relay node has adopted the new address information. It should be noted that, in an optional embodiment of the present disclosure, the substance of the information included in the second address update message may be the same as the information included in the first address update message. That is, when updating the address information of the relay node or the distributed unit of the relay node, the address update message (corresponding to the first address update message) may be actively transmitted from the CU of the anchor node to the relay node or the DU of the relay node; the address update message (corresponding to the second address update message) may transmitted from the CU of the anchor node to the relay node or the DU of the relay node, after the CU of the anchor node receives the address update notification message transmitted by the DU of the anchor node.

In an optional embodiment of the present disclosure, after the relay node or the DU of the relay node transmits the address update request message to the CU of the anchor node, it may also include:
  receiving an address update request acknowledge message transmitted by the CU of the anchor node. Wherein, the address update request acknowledge message is used to determine that the CU of the anchor node receives the address update request message transmitted from the relay node or the DU of the relay node to the CU of the anchor node.

Regarding the above methods for updating the address information provided in the embodiments of the present disclosure, with regard to the above manners 1, 2 and 3, the following describes the three manners from another perspective. In particularly, the embodiment of the present disclosure provides a method for updating address information, which may include the following manners.

Manner 4: the relay node or a DU of the relay node receives a first address update message transmitted by a CU of an anchor node.

Manner 5: the CU of the anchor node receives an address update notification message transmitted by the DU of the anchor node.

Manner 6: the CU of the anchor node receives an address update request message transmitted by the relay node or the DU of the relay node.

Optionally, the above first address update message, the address update notification message, or the address update request message may be a F1AP message, or an RRC message, or other messages. For information included in the above messages, refer to the corresponding description in the foregoing.

Optionally, for the manner 4, after the relay node or the DU of the relay node receives the first address update message, the method may further include:
  transmitting the first address update acknowledge message to the CU of the anchor node.

Optionally, for the manner 5, the receiving, by the CU of the anchor node, an address update notification message transmitted by the DU of the anchor node may further include at least one of the following:
  transmitting an update notification acknowledge message to the DU of the anchor node;
  transmitting a second address update message to the relay node or the DU of the relay node; and
  transmitting a second address update message to the relay node or the DU of the relay node, and receiving the second address update acknowledge message transmitted by the relay node or the DU of the relay node.

Optionally, for the manner 6, after the CU of the anchor node receives the address update request message, the method further includes:
  transmitting an address update request acknowledge message to the relay node or the DU of the relay node.

Understandably, the above manners 4 and 1 are corresponding descriptions of the same scheme from two perspectives, the above manners 5 and 2 are corresponding descriptions of the same scheme from two perspectives, and the above manners 6 and 3 are corresponding descriptions of the same scheme from two perspectives, wherein the detail descriptions of the above manners 4, 5 and 6 may refer to the corresponding descriptions of manners 1, 2, and 3 above, and details are not repeated here.

In order to better explain the method for updating the address information provided in the embodiments of the present disclosure, the method is further described below in combination with specific embodiments.

Figure 10:
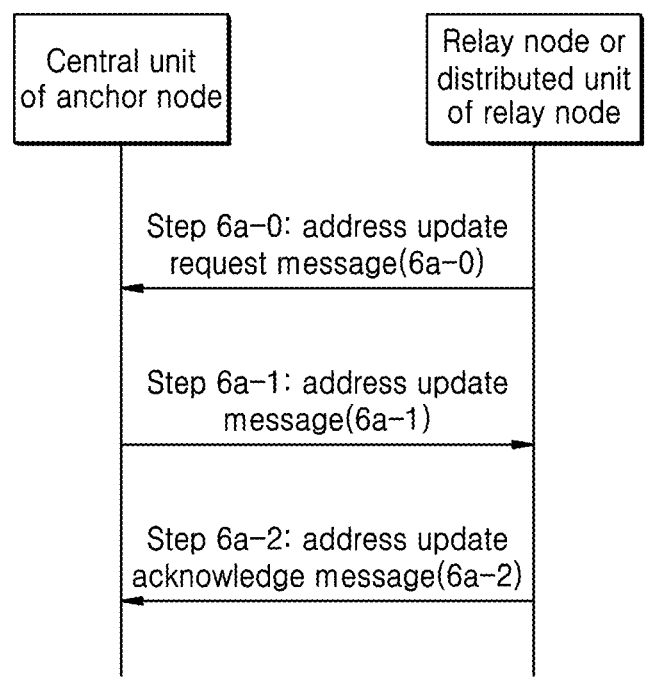
FIG. 10 illustrates a schematic flowchart of an address information update method according to an embodiment of the present disclosure.

FIG. 10 illustrates a schematic flowchart of an address information update method according to an embodiment of the present disclosure.

Example 1

In this example, manner 1 is used as an example for description, wherein the new address information of the relay node (or the distributed unit of the relay node) m allocated or configured by the central unit of the anchor node, as shown in FIG. 10, and the update process of the address information in this example may include:

Step 6a-1: the central unit of the anchor node may transmit an address update message 6a-1 (that is, the above-mentioned first address update message) to the relay node (or the distributed unit of the relay node), and the message may include at least one of the following information:
- the identification information of the relay node (or the distributed unit of the relay node);
- the old address information of the relay node (or the distributed unit of the relay node);
- the new address information of the relay node (or the distributed unit of the relay node);
- the newly added address information of the relay node or the DU of the relay node;
- the address information of the relay node or the DU of the relay node that needs to be deleted or released or removed;
- the old address information of the anchor node (or the central unit of the anchor node or the distributed unit of the anchor node);
- the new address information of the anchor node (or the central unit of the anchor node or the distributed unit of the anchor node);
- the newly added address information of the anchor node or the CU of the anchor node;
- the address information of the anchor node or the CU of the anchor node that needs to be deleted or released or removed;
- the address information requested to be deleted or released or removed; and
- the relevant address information used for the establishment of IPSec tunnel;

For specific content of the foregoing information included in the address update message 6a-1, reference may be made to the foregoing description of the "the address update message, the address update notification message, or the address update request message".

Optionally, as shown in FIG. 10, after step 6a-1, the update process may further include step 6a-2: the relay node (or the distributed unit of the relay node) may transmit an address update acknowledge message 6a-2 (the above-mentioned first address update acknowledge message) to the central unit of the anchor node, which confirms that the relay node has adopted the new address.

Optionally, before step 6a-1, the update process may further include step 6a-0: the relay node (or the distributed unit of the relay node) may transmit an address update request message 6a-0 to the central unit of the anchor node, and the content included in the message may refer to the above-mentioned description about "the first address update message, the address update notification message, or the address update request message"; in one embodiment, the request message 6a-0 may include one of the following information: 1) the identification information of the relay node or the DU of the relay node; 2) the indication information of the number of the requested new address information; 3) the address information requested to be deleted or released or removed.

In this optional embodiment, the central unit of the anchor node may transmit the address update message 6a-1 to the relay node or the distributed unit of the relay node, after receiving the address update request message 6a-0 transmitted by the relay node or the distributed unit of the relay node.

Figure 11:
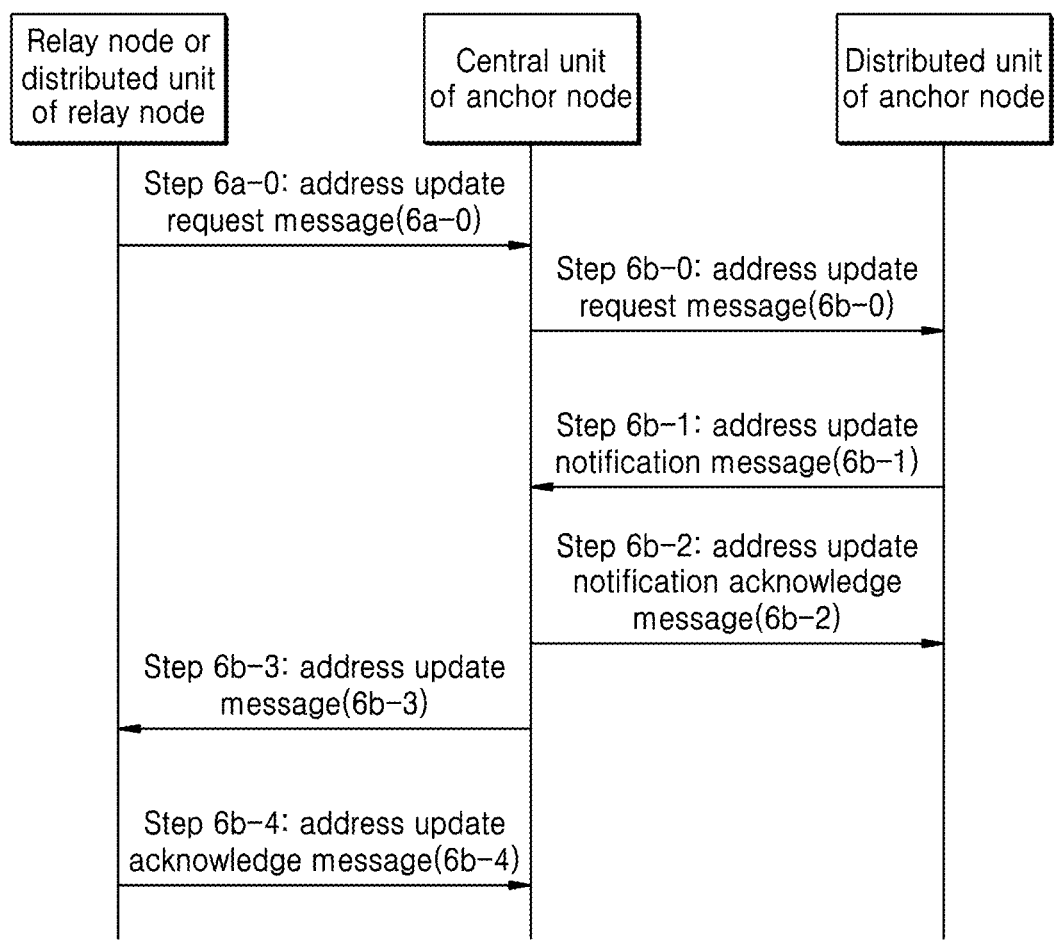
FIG. 11 illustrates a schematic flowchart of an address information update method according to an embodiment of the present disclosure.

FIG. 11 illustrates a schematic flowchart of an address information update method according to an embodiment of the present disclosure.

Example 2

In this example, manner 2 is used as an example for description, wherein the new address information of the relay node (or the distributed unit of the relay node) may be allocated by the distributed unit of the anchor node, as shown in FIG. 11, and the update process of the address information in the example 2 may include:

Step 6b-1: the distributed unit of the anchor node may transmit an address update notification message 6b-1 to the central unit of the anchor node, and the message may include at least one of the following information:
- the identification information of the relay node (or the distributed unit of the relay node);
- the old address information of the relay node (or the distributed unit of the relay node), such as the IP address and/or port, or the newly defined address information; the specific content of the address information may refer to the above-mentioned description of "the address update message, the address update notification message or the address update request message";
- the new address information of the relay node (or the distributed unit of the relay node), such as the IP address and/or port, or the newly defined address information; the specific content of the address information may refer to the above-mentioned description of "the address update message, the address update notification message or the address update request message";
- the newly added address information of the relay node or the DU of the relay node;
- the address information of the relay node or the DU of the relay node that needs to be deleted or released or removed; and
- the address information requested to be deleted, released and removed.

For specific content of the foregoing other information included in the address update notification message 6b-1, reference may be made to the foregoing description of the "the first address update message, the address update notification message, or the address update request message".

Optionally, as shown in FIG. 11, after step 6b-1, the update process may further include step 6b-2: the central unit of the anchor node may transmit an update notification acknowledge message 6b-2 to the distributed unit of the anchor node, wherein the acknowledge message may be used to confirm that the central unit of the anchor node has received the updated address information.

Optionally, as shown in FIG. 11, after step 6b-1, the update process may further include step 6b-3: the CU of the anchor node may transmit the address update message 6b-3 (i.e., the second address update message) to the relay node (the DU of the relay node). For specific content of the other information included in the address update message 6b-3, reference may be made to the foregoing description of the "the first address update message, the address update notification message, or the address update request message". That is, after the central unit of the anchor node obtains the updated address information of the relay node (or the distributed unit of the relay node), the central unit of the anchor node may also inform the relay node (or the distributed unit of the relay node) of this information, wherein the specific content of the message may be obtained by referring to the information obtained in step 6a-1 in Example 1 above.

Optionally, as shown in FIG. 11, after step 6b-3, the update process may further include step 6b-4: the relay node (or the distributed unit of the relay node) may transmit an address update acknowledge message 6b-4 to the central unit of the anchor node, which confirms that the relay node (or the distributed unit of the relay node) has adopted the new address, and the specific content of the message may refer to step 6a-2 in Example 1 above.

Optionally, as shown in FIG. 11, before step 6b-1, the update process may further include step 6b-0: the central unit of the anchor node may transmit an address update request message 6b-0 to the distributed unit of the anchor node, wherein the specific content included in the message may refer to the foregoing description about the "the first address update message, the address update notification message, or the address update request message". In this optional scheme, the DU of the anchor node may transmit the address update notification message 6b-1 to the CU of the anchor node, after receiving the address update request message 6b-0 transmitted by the CU of the anchor node. In one embodiment, the address update request message 6b-0 may include at least one of the following information: 1) the identification information of the relay node or the DU of the relay node, 2) the indication information of the number of the requested new address information, 3) the address information that needs to be deleted or released or removed at the relay node or the DU of the relay node, 4) the address information requested to be deleted, released or removed.

Optionally, as shown in FIG. 11, before step 6b-0, the update process may further include step 6a-0: the relay node (or the distributed unit of the relay node) may transmit an address update request message 6a-0 to the central unit of the anchor node, wherein the specific content in the message may refer to the foregoing description about the "the first address update message, the address update notification message, or the address update request message", and in one implementation, may refer to the address update request message 6a-0 in Example 1 above. At this time, the central unit of the anchor node may transmit a corresponding address update request message 6b-0 to the distributed unit of the anchor node after receiving the address update request message 6a-0, and the distributed unit of the anchor node completes the allocation for the new address information of the relay node (or the DU of the relay node).

Figure 12:
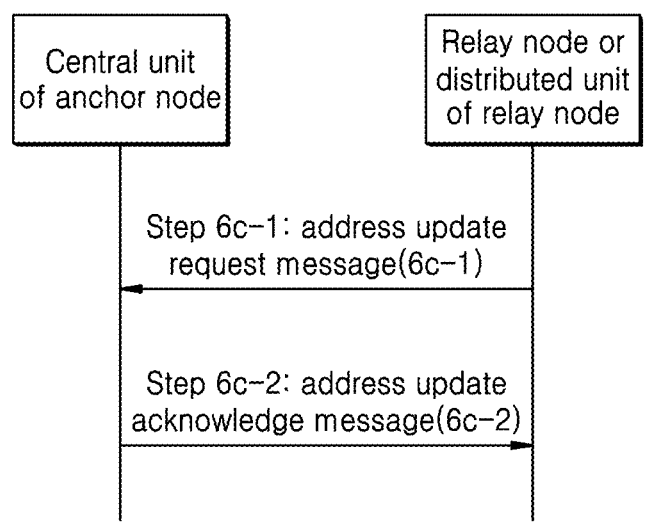
FIG. 12 illustrates a schematic flowchart of an address information update method according to an embodiment of the present disclosure.

FIG. 12 illustrates a schematic flowchart of an address information update method according to an embodiment of the present disclosure.

Example 3

In this example, the manner 3 is used as an example for description, that is, taking that the new address information of the relay node (or the DU of the relay node) is obtained by itself, for example, through the configuration of OAM, or allocation of DHCP server, or etc. as an example for description, as shown in FIG. 12, and the update process of the address information may include:

Step 6c-1: the relay node (or the distributed unit of the relay node) may transmit an address update request message 6c-1 to the central unit of the anchor node, and the message may include at least one of the following information:

the identification information of the relay node (or the distributed unit of the relay node);

the old address information of the relay node (or the distributed unit of the relay node), such as the IP address and/or port, or the newly defined address information; the specific content of the address information may refer to the above-mentioned description of "the address update message, the address update notification message or the address update request message"; and the new address information of the relay node (or the distributed unit of the relay node), such as the IP address and/or port, or the newly defined address information, wherein the specific content of the address information may refer to the above description of "the address update message, the address update notification message or the address update request message"; for other information contained in the address update request message 6c-1, the above description of "the first address update message, address update notification message, or address update request message" may also be referred to.

Optionally, as shown in FIG. 12, after step 6c-1, the update process may further include step 6c-2: the central unit of the anchor node may transmit an address update request acknowledge message 6c-2 to the relay node (or the distributed unit of the relay node). This message may be used to confirm that the central unit of the anchor node has received the address update request message 6c-1 transmitted by the relay node (or the distributed unit of the relay node). In this example, the acknowledge message may be specifically used for confirming that the central unit of the anchor node has received the updated address information.

According to the above three types of address information update solutions provided in the embodiments of the present disclosure, the address information of the relay node side of the GTP-U tunnel or the TNL association established between the CU of the anchor node and the relay node (or the DU of the relay node), may be all updated to new address information. Therefore, there is no need to separately update the address information for the GTP-U tunnel or TNL association of each radio bearer of each user established between the central unit of the anchor node and the relay node. Wherein, the messages involved in the above update processes (such as the address update message, the address update acknowledge message, the address update notification message, the address update notification acknowledge message, the address update request message, and the address update request acknowledge message) may be messages of the F1 interface in the prior art, or newly defined message, or non-UE associated message, or UE-associated message, or RRC message; the messages may be transmitted to the DU of the relay node or the mobile terminal part of the relay node.

This disclosure may also provide a solution for configuring IPSec tunnel information, which includes the following steps:

Step 7-1: the anchor node or the central unit of the anchor node transmits an IPSec tunnel configuration message to the relay node or the distributed unit of the relay node, so that the relay node or the distributed unit of the relay node establishes the IPSec tunnel with the anchor node or the CU of the anchor node according to the content in the IPSec tunnel configuration message. Wherein, the IPSec tunnel configuration message includes at least one of the following information:

the identification information of the relay node (or the distributed unit of the relay node);

the address information used by the relay node or the distributed unit side of the relay node, which may be IP address information, and/or port information, and/or prefix length information of the IP address, when establishing an IPSec tunnel; and the address information used by the anchor node or the central unit side of the anchor node, which may be IP address information, and/or port information, and/or prefix length information of the IP address, when establishing an IPSec tunnel.

The IPSec tunnel configuration message may be an F1AP message (such as gNB-CU Configuration Update) or an RRC message. One implementation manner is that after the F1 interface is established between the anchor node or the central unit of the anchor node and the relay anchor or the distributed unit of the relay node, the anchor node or the central unit of the anchor node transmits an IPSec tunnel configuration message through the F1AP message; another implementation manner is that when the F1 interface is not established between the anchor node or the central unit of the anchor node and the relay node or the distributed unit of the relay node, the anchor node or the central unit of the anchor node transmits the IPSec tunnel configuration message through an RRC message.

The beneficial effect of this example includes that the relay node or the distributed unit of the relay node may establish an IPSec tunnel with the anchor node or the central unit of the anchor node according to the content in the received IPSec tunnel configuration message, in order to provide security protection for data transmission on the F1 interface.

The respective solutions provided by the embodiments of the present disclosure have at least the following beneficial effects.

1. Based on the solution provided in the first aspect of the present disclosure, different indication information may be added for data packets of different types of user data, so as to distinguish different types of user data.
2. Based on the solution provided in the second aspect of this application, each node for serving user data may obtain the address information of the source transmission node and destination reception node (accessing relay node) of the user data, which may be convenient for adding different indication information for data packets of different types of user data, so that the distributed unit of the anchor node may distinguish different types of user data.
3. Based on the solution provided in the third aspect of the present disclosure, the address information of the relay node side of the GTP-U tunnel or TNL association established between the central unit of the anchor node and the relay node (or the distributed unit of the relay node) may be updated to new address information, which is not necessary to update address information for the GTP-U tunnel or TNL association of each radio bearer of each user established between the anchor node and the relay node. Another effect of is that when the relay node or the DU side of the relay node obtains new address information, the relay node or the DU side of the relay node may use the new address information to transmit and receive the control plane data or user plane data with the anchor node or the CU of the anchor node. When the relay node or the DU side of the relay node obtains the address information to be deleted, it may remove some addresses in use and save resources. In addition, by using the first address update request message, the relay node or the DU of the relay node may request the CU of the anchor node to update (such as modify, add, delete, etc.) its address information. Another beneficial effect is that the relay node or the distributed unit of the relay node may establish an IPSec tunnel with the anchor node or the central unit of the anchor node, in order to provide security protection for data transmission on the F1 interface.

Figure 13:
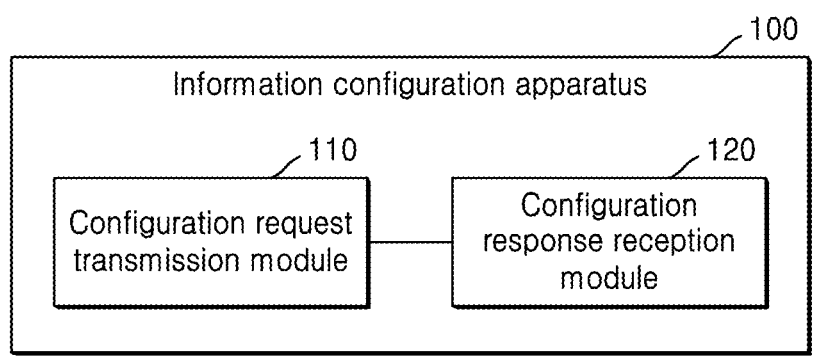
FIG. 13 illustrates a schematic structure diagram of an information configuration apparatus according to an embodiment of the present disclosure.

Corresponding to the same principle as the method shown in FIG. 4, the embodiment of the present disclosure provides an information configuration apparatus, which may be set in a first node. FIG. 13 illustrates a schematic structure diagram of an information configuration apparatus according to an embodiment of the present disclosure.

As shown in FIG. 13, the information configuration apparatus 100 may include a configuration request transmission module 110 and the configuration response reception module 120, wherein:

the configuration request transmission module 110 is configured to transmit the first configuration request message to the second node; and the configuration response reception module 120 is configured to receive the first configuration response message transmitted by the second node based on the first configuration request message.

Optionally, the first configuration request message is used to negotiate profile indication information of user data between the first node and the second node;

wherein, the profile indication information of the user data is configured by any one or more of the following nodes:

CU of the anchor node;

CU-CP of the anchor node;

CU-UP of the anchor node;

DU of the anchor node;

another base station or CU of another base station; and source transmission node for user data.

Optionally, the first node and the second node may include any of the following:

the first node is the CU of the anchor node, and the second node is the DU of the anchor node, another base station, or the CU of another base station;

the first node is the CU-CP of the anchor node, and the second node is the CU-UP of the anchor node, the DU of the anchor node, another base station, or the CU of another base station; and the first node is another base station or a CU of another base station, the second node is a CU of an anchor node or a CU-CP of the anchor node.

Alternatively, the first configuration request message may carry information related to user data that the first node expects or requests to be accepted by the second node, and the first configuration request message may include at least one of the following:
information related to data profile;
profile indication information of the user data;
information related to the destination reception node;
information related to the source transmission node; and
information related to the data transmission path.

The first configuration response message may carry information related to user data accepted by the second node, and the first configuration response message may include at least one of the following:
information related to data profile;
profile indication information of the user data;
information related to the source transmission node;
information related to the destination reception node; and
information related to the data transmission path.

Optionally, the information configuration apparatus 100 may further include:
the configuration request reception module is configured to receive the second configuration request message transmitted by the third node; and
the configuration response transmission module is configured to transmit the second configuration response message to the third node, according to the second configuration request message.

Optionally, the receiving of the second configuration request message may be before transmitting the first configuration request message to the second node, the user data targeted by the first configuration request message is determined according to the user data targeted by the second configuration request message.

Optionally, if the profile indication information of the user data is configured by the first node, the second configuration response message may be transmitted to the third node after receiving the first configuration response message, or before transmitting the first configuration request message to the second node, or before transmitting the first configuration request message to the second node.

Optionally, if the profile indication information of the user data is configured by the second node, the second configuration response message is transmitted to the third node after receiving the first configuration response message.

Optionally, if the second configuration response message is transmitted to the third node after receiving the first configuration response message, the second configuration response message may be determined based on the first configuration response message.

Optionally, if the profile indication information of the user data is configured by the first node, the first configuration response message is determined by the second node based on the third configuration response message;
wherein, the third configuration response message is obtained by the second node in the following manner:
the third configuration request message is transmitted to the fourth node; and
the third configuration response message is received, which is fed back by the fourth node based on the third configuration request message.

Figure 14:
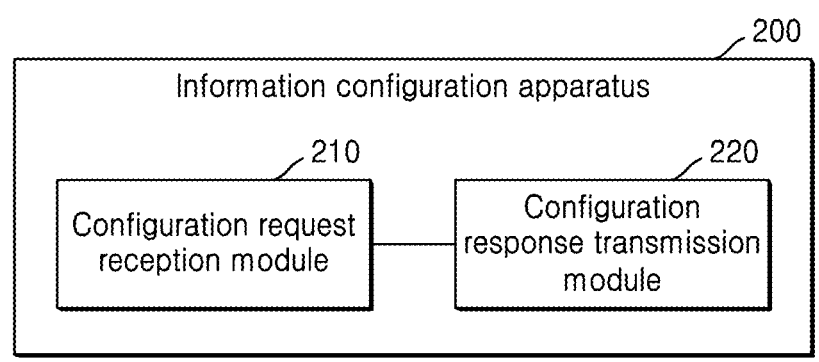
FIG. 14 illustrates a schematic structure diagram of an information configuration apparatus according to an embodiment of the present disclosure.

Corresponding to the same principle as the method shown in FIG. 4, the embodiment of the present disclosure provides an information configuration apparatus, which may be set in the second node. FIG. 14 illustrates a schematic structure diagram of an information configuration apparatus according to an embodiment of the present disclosure. As shown in FIG. 14, the information configuration apparatus 200 may include a configuration request reception module 210 and the configuration response transmission module 220, wherein:
the configuration request reception module 210 is configured to receive a first configuration request message transmitted by a first node; and
the configuration response transmission module 220 is configured to transmit a first configuration response message to the first node according to the first configuration request message.

Optionally, the information configuration apparatus 200 may further include:
the configuration request transmission module, configured to transmit the third configuration request message transmitted to the fourth node; and
the configuration response reception module, configured to receive the third configuration response message fed back, based on the third configuration request message, by the fourth node.

Corresponding to the same principle as the method shown in FIG. 9, an embodiment of the present disclosure provides an information interaction apparatus, which may be provided in a fifth node, and the apparatus may include a configuration message transmission module configured to:
transmitting a fourth configuration message to a sixth node, wherein the message is used for performing interaction, between the fifth node and the sixth node, with information related to the source transmission node and/or the destination reception node of the user data.

Optionally, the fifth node and the sixth node may be at least one of the following:
the fifth node is the CU of the anchor node, and the sixth node is the DU of the anchor node, another base station, or the CU of another base station;
the fifth node is another base station or the CU of another base station, and the sixth node is the CU of the anchor node; and
the fifth node is the DU of the anchor node, and the sixth node is the CU of the anchor node.

Optionally, the fourth configuration message includes at least one of the following:
user identification information;
information related to data profile; and
information related to the source transmission node and/or information related to the destination reception node.

Optionally, when transmitting the fourth configuration message to the sixth node, the configuration message transmission module may be specifically configured to:
receiving the fourth configuration request message transmitted by the sixth node; and
transmitting a fourth configuration message to the sixth node based on the node configuration request information.

Optionally, the fourth configuration request message may include at least one of the following:
user identification information;
information related to data profile;
information related to the source transmission node; and
information related to the destination reception node.

Optionally, one of the fourth configuration request message and the fourth configuration message may not include information related to the same node, and the same node is a source transmission node or a destination reception node.

Optionally, the apparatus may further include:
a configuration acknowledge message reception module, configured to receive a fourth configuration acknowledge message, transmitted by the sixth node based on the node configuration information, after transmitting the fourth configuration message to the sixth node.

Optionally, the node configuration acknowledge message may include at least one of the following:
user identification information;
information related to data profile;
information related to the source transmission node; and
information related to the destination reception node.

Optionally, one of the fourth configuration message and the node configuration acknowledge message does not include information related to the same node, and the same node is a source transmission node or a destination reception node.

Corresponding to the same principle as the method shown in FIG. 9, an embodiment of the present disclosure provides an information interaction apparatus, which may be provided in a sixth node, and the apparatus may include a configuration message reception module configured to:
receive the fourth configuration message transmitted by a fifth node, wherein the fourth configuration message is used for performing interaction, between the fifth node and the sixth node, with related information of the source transmission node and/or the destination reception node of the user data.

Optionally, the fifth node and the sixth node may be at least one of the following:
the fifth node is the CU of the anchor node, and the sixth node is the DU of the anchor node, another base station, or the CU of another base station;
the fifth node is another base station or the CU of another base station, and the sixth node is the CU of the anchor node; and
the fifth node is the DU of the anchor node, and the sixth node is the CU of the anchor node.

Optionally, the fourth configuration message includes at least one of the following:
user identification information;
information related to data profile; and
information related to the source transmission node and/or information related to the destination reception node.

Optionally, the fourth configuration message reception module is specifically configured to:
transmit the fourth configuration request message to the fifth node; and
receive the fourth configuration message, transmitted by the fifth node based on the node configuration request message.

Optionally, the fourth configuration request message includes at least one of the following:
user identification information;
information related to data profile;
information related to the source transmission node; and
information related to the destination reception node.

Optionally, one of the fourth configuration request message and the fourth configuration message may not include information related to the same node, and the same node is a source transmission node or a destination reception node.

Corresponding to the same principle as the method for updating the address information of the relay node provided in the embodiments of the present disclosure, the embodiment of the present disclosure provides an apparatus for updating address information of a relay node, wherein if the update apparatus may be provided in an CU of an anchor node, the apparatus includes an address update message transmission module configured to:
transmitting the first address update message to the relay node or the DU of the relay node;
if the update apparatus is provided in the DU of the anchor node, the apparatus includes an address update notification module configured to:
transmit an address update notification message to the CU of the anchor node; and
if the update apparatus is provided in the relay node or the DU of the relay node, the apparatus includes an address update request module configured to:
transmit an address update request message to the CU of the anchor node.

Optionally, the first address update message, the address update notification message, or the address update request message includes at least one of the following information:
identification information of the relay node or the DU of the relay node;
address information of the relay node or the DU of the relay node before update;
updated address information of the relay node or the DU of the relay node;
newly added address information of the relay node or the DU of the relay node;
address information of the relay node or the DU of the relay node that needs to be deleted;
indication information of the number of requested new address information;
address information requested to be updated;
address information requested to be deleted; and
relevant address information used for the establishment of IPSec tunnel.

Optionally, when the update apparatus is provided in the CU of the anchor node, it further includes:
an address update acknowledge message reception module, configured to receive the first address update acknowledge message, transmitted by the relay node or the DU of the relay node based on the first address update message.

In this solution, the new address information of the relay node or the DU of the relay node may be allocated by the distributed unit of the anchor node.

Optionally, when the update apparatus is provided in the DU of the anchor node, the update apparatus may include an update notification acknowledge message reception module configured to:
receive an update notification acknowledge message, transmitted by the CU of the anchor node based on the address update notification message.

In this solution, the new address information of the relay node or the DU of the relay node may be allocated by the central unit of the anchor node.

Optionally, when the update apparatus is provided in the relay node or the DU of the relay node, the update apparatus may further include:
an acknowledge message reception module, configured to receive the address update request acknowledge message, transmitted by the CU of the anchor node based on the address update request message.

In this solution, the new address information of the relay node or the DU of the relay node may be obtained by itself.

Corresponding to the method for updating the address information of the relay node provided by the embodiment of the present disclosure, an embodiment of the present disclosure provides an apparatus for updating address information of a relay node. If the apparatus is provided in a relay node or a DU of a relay node, the apparatus includes an address update message reception module configured to:

receive a first address update message transmitted by the CU of the anchor node;

if the apparatus is provided in the CU of the anchor node, the apparatus includes an address update notification reception module configured to:

receive an address update notification message transmitted by the DU of the anchor node; and if the apparatus is provided in the CU of the anchor node, the apparatus includes an address update request reception module configured to:

receive an address update request message transmitted by the relay node or the DU of the relay node.

Optionally, the first address update message, the address update notification message, or the address update request message includes at least one of the following information:

identification information of the relay node or the DU of the relay node;

address information of the relay node or the DU of the relay node before update;

updated address information of the relay node or the DU of the relay node;

newly added address information of the relay node or the DU of the relay node;

address information of the relay node or the DU of the relay node that needs to be deleted;

indication information for requesting new address information;

indication information of the number of requested new address information;

address information requested to be updated;

address information requested to be deleted; and information about the addresses used when establishing security-related protocol IPSec tunnel.

Optionally, when the update apparatus is provided in the relay node or the DU of the relay node (new address information of the relay node or the DU of the relay node may be allocated by the CU of the anchor node), the apparatus further includes:

an address update acknowledge information transmission module, configured to transmit a first address update acknowledge message to the CU of the anchor node after receiving the first address update message transmitted by the CU of the anchor node.

Optionally, when the update apparatus is provided in the CU of the anchor node (the new address information of the relay node or the DU of the relay node may be allocated by the DU of the anchor node), the update apparatus may include an address update notification acknowledge message transmission module configured to:

transmit an update notification acknowledge message to the DU of the anchor node, after receiving the address update notification message transmitted by the DU of the anchor node.

Optionally, when the update apparatus is provided in the CU of the anchor node (new address information of the relay node or the DU of the relay node may be allocated by the DU of the anchor node), the apparatus may further include at least one of the following modules:

the address update message transmission module, configured to transmit the second address update message to a relay node or the DU of the relay node; and an address update acknowledge message reception module, configured to receive the second address update acknowledge message, transmitted by the relay node or the DU of the relay node based on the second address update message.

Optionally, when the update apparatus is provided in the CU of the anchor node (the new address information of the relay node or the DU of the relay node may be obtained by itself), the update apparatus may include an update request acknowledge transmission module configured to:

transmit the address update request acknowledge message to the relay node or the DU of the relay node, after receiving the address update acknowledge message transmitted by the relay node or the DU of the relay node.

Based on the principles of the solutions provided in this disclosure, an embodiment of the disclosure provides an information interaction system, and the information interaction system may include at least one of the apparatus provided in any embodiment of the disclosure.

Based on the principles of the solutions provided in this disclosure, an embodiment of the present disclosure provides a communication network system, which may include the information interaction system provided in the embodiments of the present disclosure.

An embodiment of the present disclosure provides an electronic device including a processor and a memory, wherein the memory stores machine readable instructions, and the processor is configured to execute the machine-readable instructions to implement the method provided by any embodiment of the present disclosure.

An embodiment of the present disclosure also provides a computer-readable storage medium, and a computer program is stored thereon for implementing when the computer program is executed by a processor, the method provided by any embodiment of the present disclosure.

Figure 15:
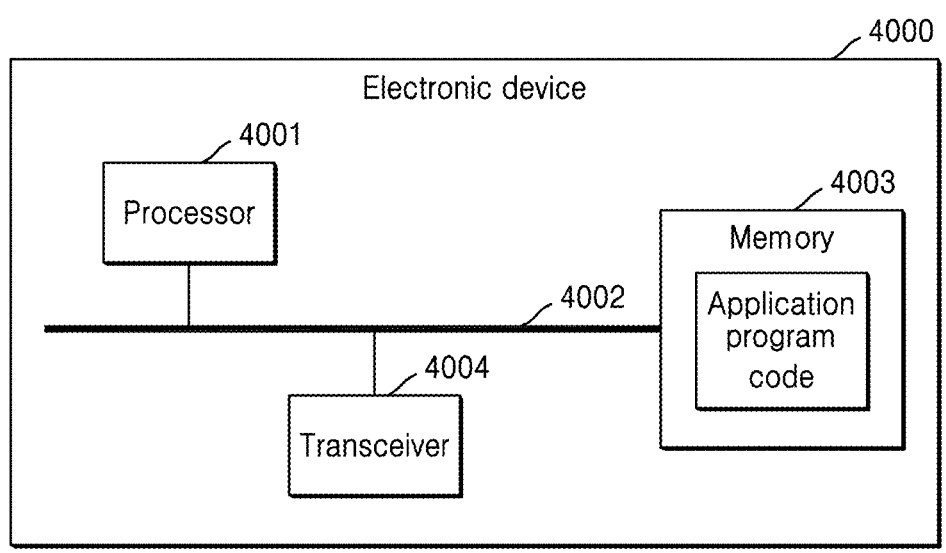
FIG. 15 is a schematic structural diagram of an electronic according to an embodiment of the present disclosure.

FIG. 15 is a schematic structural diagram of an electronic according to an embodiment of the present disclosure. In an optional embodiment, an electronic device is provided.

As shown in FIG. 15, the electronic device 4000 may include a processor 4001 and a memory 4003. Wherein, the processor 4001 and the memory 4003 may be connected, for example, through a bus 4002. Optionally, the electronic device 4000 may further include a transceiver 4004. However, all of the illustrated components are not essential. In addition, the processor 4001 and the transceiver 4004 and the memory 4003 may be implemented as a single chip according to another embodiment. It should be noted that, in actual applications, the transceiver 4004 is not limited to one, and the structure of the electronic device 4000 does not limit the embodiments of the present disclosure.

The processor 4001 may be a CPU (central processing unit), a general-purpose processor, a DSP (data signal processor), an ASIC (Application Specific Integrated Circuit), or an FPGA (Field Programmable Gate Array) or other programmable logic devices, transistor logic devices, hardware components or any combination thereof. These may implement or execute various exemplary logical blocks, modules, and circuits described in connection with the disclosure. The processor 4001 may also be a combination that realizes a computing function, for example, a combination including one or more microprocessors, a combination of a DSP and a microprocessor, and the like. The processor 4001 may include one or more processors or other processing devices that control the proposed function, process, and/or method. Operation of the electronic device 4000 may be implemented by the processor 4001.

The bus 4002 may include a path for transmitting information between the aforementioned components. The bus 4002 may be a PCI (Peripheral Component Interconnect) bus or an EISA (Extended Industry Standard Architecture) bus, or the like. The bus 4002 may be divided into an address bus, a data bus, a control bus, and the like. For ease of representation, only one thick line is illustrated in FIG. 15, but it does not mean that there is only one bus or one type of bus.

The memory 4003 may be a ROM (Read Only Memory, read-only memory) or other types of static storage devices that may store static information and instructions, a RAM (Random Access Memory, random access memory), or other types of information dynamic storage device, which may also be EEPROM (Electrically Erasable Programmable Read Only Memory), CD-ROM (Compact Disc Read Only Memory, CD-ROM) or other optical disk storage, optical disk storage (including compression Optical discs, laser discs, optical discs, digital versatile discs, Blu-ray discs, etc.), disk storage media or other magnetic storage devices, or may be another medium used to carry or store desired program code in the form of instructions or data structures and may be accessed by a computer, which is not limited to this.

The memory 4003 is configured to store application program code for executing the solution of the present disclosure, and is controlled by the processor 4001 to perform execution. The processor 4001 is configured to execute application program code stored in the memory 4003 to implement the content shown in any one of the foregoing method embodiments.

The transceiver 4004 may include a RF transmitter for up-converting and amplifying a transmitted signal, and a RF receiver for down-converting a frequency of a received signal. However, according to another embodiment, the transceiver 4004 may be implemented by more or less components than those illustrated in components.

The transceiver 4004 may be connected to the processor 4001 and transmit and/or receive a signal. The signal may include control information and data. In addition, the transceiver 4004 may receive the signal through a wireless channel and output the signal to the processor 4001. The transceiver 4004 may transmit a signal output from the processor 4001 through the wireless channel.

Figure 16:
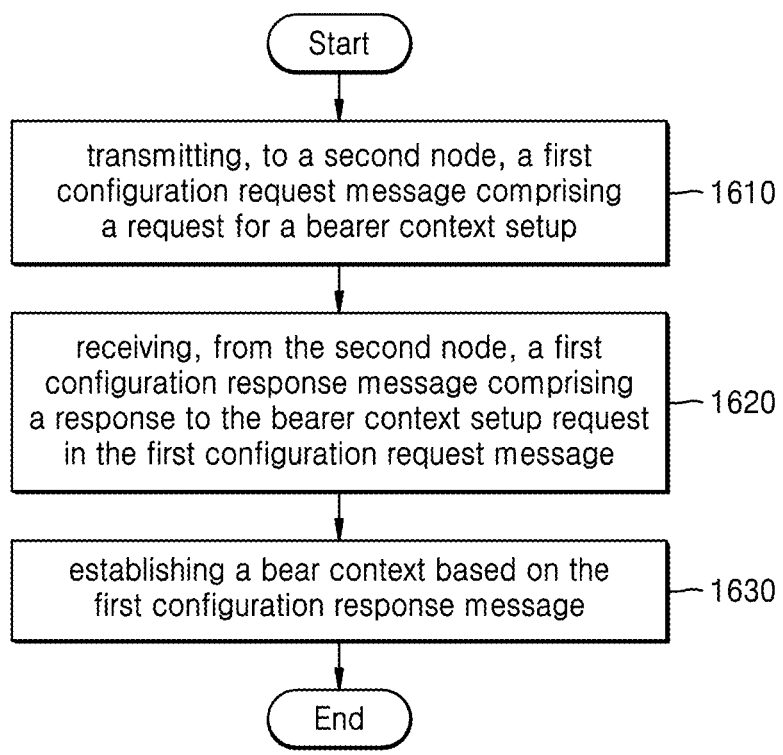
FIG. 16 is a flow chart illustrating a method performed by a first node in a wireless communication system.

FIG. 16 is a flow chart illustrating a method performed by a first node in a wireless communication system.

Referring to FIG. 16, in operation 1610, the first node may transmit, to a second node, a first configuration request message comprising a request for a bearer context setup. The first configuration request message may include at least one of information related to data profile, or profile indication information. The information related to data profile may include at least one of address information of destination which is an IP address used for a user plane transport or TEID (Tunnel Endpoint ID) of the destination indicating which tunnel a particular T-PDU belongs to. The profile indication information may include at least one of information for setting DSCP (Differentiated Service Code Point), or information for setting a flow label filed.

In operation 1620, the first node may receive, from the second node, a first configuration response message comprising a response to the bearer context setup request in the first configuration request message.

In operation 1630, the first node may establish a bear context based on the first configuration response message.

Figure 17:
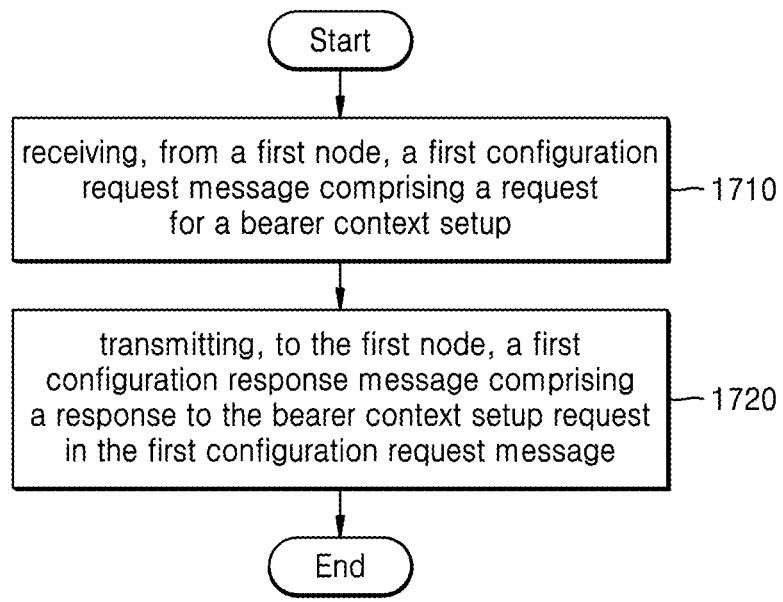
FIG. 17 is a flow chart illustrating a method performed by a second node in a wireless communication system.

FIG. 17 is a flow chart illustrating a method performed by a second node in a wireless communication system.

Referring to FIG. 17, in operation 1710, the second node may receive, from a first node, a first configuration request message comprising a request for a bearer context setup. The first configuration request message may include at least one of information related to data profile, or profile indication information. The information related to data profile may include at least one of address information of destination which is an IP address used for a user plane transport or TEID (Tunnel Endpoint ID) of the destination indicating which tunnel a particular T-PDU belongs to. The profile indication information may include at least one of information for setting DSCP (Differentiated Service Code Point), or information for setting a flow label filed.

In operation 1720, the second node may transmit, to the first node, a first configuration response message comprising a response to the bearer context setup request in the first configuration request message.

It should be understood that although the various steps in the flowchart of the drawings are sequentially displayed as indicated by the arrows, these steps are not necessarily performed in the order indicated by the arrows. Except as explicitly stated herein, the execution of these steps is not strictly limited, and may be performed in other sequences. Moreover, at least some of the steps in the flowchart of the drawings may include a plurality of sub-steps or stages, which are not necessarily performed at the same time, but may be executed at different times, and the order of execution thereof is not necessarily to be performed sequentially, but may be performed by turns or alternately with at least a part of the sub-steps or stages of other steps, or other steps.

The foregoing is only a part of the embodiments of the present disclosure, and it should be noted that those skilled in the art may also make several improvements and retouching without departing from the principles of the present disclosure, which should be considered as the protection scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a central unit (CU) of an integrated access and backhaul (IAB) donor node (IAB donor CU), the method comprising:
   receiving, from a distributed unit (DU) of the IAB donor node (IAB donor DU), a first message to allocate an internet protocol (IP) address for data transmissions of a control plane and a user plane over an F1 interface between the IAB donor CU and an IAB node; and
   transmitting, to the IAB node, a first radio resource control (RRC) message including an IP address allocated by the IAB donor DU based on the first message.

2. The method of claim 1, wherein:
   the first message includes an IP address allocated to the IAB node and a first indication information of a usage of an IP address, and
   the first RRC message includes the IP address allocated to the IAB node and a second indication information of the usage of the IP address.

3. The method of claim 2, wherein the usage of the IP address includes F1-control plane (F1-C) traffic and F1-user plane (F1-U) traffic.

4. The method of claim 1, further comprising:
   receiving, from the IAB node, a second RRC message requesting the IP address, and
   transmitting, to the IAB donor DU, a second message to obtain the IP address for the IAB node.

5. The method of claim 4, wherein:
the second RRC message includes a number of requested IP addresses used for F1-control plane (F1-C) traffic, and a number of requested IP addresses used for F1-user plane (F1-U) traffic, and
the second message includes the number of requested IP addresses used for the F1-C traffic and the number of requested IP addresses used for the F1-U traffic.

6. The method of claim 1, wherein the first RRC message includes an IP address to be released at the IAB node.

7. The method of claim 4, wherein the second message includes an IP address to be released which is no longer used by the IAB node.

* * * * *